(12) United States Patent
Ravichandran et al.

(10) Patent No.: US 8,868,503 B1
(45) Date of Patent: Oct. 21, 2014

(54) METHOD AND SYSTEM FOR MANAGING CLONES OF REPLICATED STORAGE

(75) Inventors: Kanthan Ravichandran, Chidambaram (IN); Vrishali Thorat, Bangalore (IN)

(73) Assignee: NetApp, Inc., Sunnyvale, CA (US)

(*) Notice: Subject to any disclaimer, the term of this patent is extended or adjusted under 35 U.S.C. 154(b) by 409 days.

(21) Appl. No.: 13/097,423

(22) Filed: Apr. 29, 2011

(51) Int. Cl.
*G06F 17/30* (2006.01)

(52) U.S. Cl.
CPC ............... *G06F 17/30088* (2013.01); *G06F 17/30215* (2013.01)
USPC ............. 707/639; 707/649; 707/736

(58) Field of Classification Search
CPC ............ G06F 17/30088; G06F 17/30215
See application file for complete search history.

(56) References Cited

U.S. PATENT DOCUMENTS

| 7,334,095 | B1* | 2/2008 | Fair et al. .................. 711/161 |
| 2005/0246397 | A1* | 11/2005 | Edwards et al. ............ 707/204 |
| 2005/0246503 | A1* | 11/2005 | Fair ........................... 711/147 |

OTHER PUBLICATIONS

Osuna, 2006, An Introduction to FlexClone Volumes, IBM.*
Ranganathan, SnapManager 3.0 for Oracle Best Practices, NetApp, Apr. 2009.*

* cited by examiner

*Primary Examiner* — Neveen Abel Jalil
*Assistant Examiner* — Kristofer Biskeborn
(74) *Attorney, Agent, or Firm* — Klein, O'Neill & Singh, LLP

(57) ABSTRACT

Method and system for using a clone of a replicated copy of a data structure as an independent data object is provided. The replicated copy and the clone share data blocks, when the clone is generated. The clone is assigned new data blocks to replace the shared data blocks. A profile for the clone is generated where the clone does not share any data blocks with the replicated copy. The profile includes an option to delete the clone profile and any associated data blocks thereof.

21 Claims, 25 Drawing Sheets

METHOD AND SYSTEM FOR MANAGING CLONES OF REPLICATED STORAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to storage systems and associated methods thereof.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least a computing system executing a storage operating system for storing and retrieving information on behalf of one or more client processing systems (may also be referred to as "clients"). The storage operating system stores and manages information in a set of mass storage devices.

Information stored at mass storage devices is typically replicated or "backed up" by a backup process that creates a backup copy of the information at a point in time. The backup copy may also be replicated or "cloned". The cloned version of the backup copy typically shares data blocks with the replicated copy of a virtual block number (vbn) space maintained by the storage operating system to store the information. A data block in the vbn is typically mapped to a storage device block number in a storage device block number (dbn) space for storing information. The cloned version of a replicated copy is typically not used as an independent data object (for example, a database) because it may share data blocks with the replicated copy. Continuous efforts are being made to effectively use the cloned version as an independent data object.

SUMMARY

In one embodiment, a method and system for using a clone of a replicated copy of a data structure as an independent data object is provided. The replicated copy in this example may be that of a database and the cloned version is used as an independent database after segregating data blocks that are shared between the replicated copy and the clone. To replace the shared blocks, the clone is assigned new data blocks by the storage operating system. A profile for the clone is generated where the clone does not share any data blocks with the replicated copy. This allows a user to use the cloned copy as an independent object, for example, as a database that is independent of the replicated copy. The profile includes an option to delete the clone profile and any associated data blocks thereof.

The embodiments disclosed herein have various advantages. For example, a user can use the clone as an independent object. The user may use the clone temporarily and delete the clone profile, which releases the data blocks assigned to the clone. This makes efficient use of the data blocks, while providing the user with the option to use the clone as an independent object.

In another embodiment, a machine implemented method is provided. A data block that is shared between a replicated copy of a data structure and a clone of the replicated copy is segregated and a new data block is assigned to the clone to replace the shared data block. A profile for the clone with the assigned new data block that is not shared with the replicated copy is generated such that the clone is used as a data object that is independent of the replicated copy for storing information. The profile includes an option for a user to delete the profile for the clone and any data blocks associated with the profile such that the data blocks associated with the profile can be re-used by a storage system.

In yet another embodiment, a machine implemented method is provided. The method includes generating a profile for a clone of a replicated copy of a data structure, after assigning a data block to the clone to replace a shared data block that is shared between the clone and the replicated copy; providing an option to delete the profile and any data blocks associated with the profile; and deleting the profile and the data blocks associated with the profile.

In another embodiment, a computing system interfacing with a storage system executing a processor executable operating system is provided. The computing system executes a processor executable application configured to generate a profile for a clone of a replicated copy of a data structure, after a new data block is assigned to the clone to replace a data block shared between the clone and the replicated coy. The profile includes an option to delete the profile and any data blocks associated with the profile In yet another embodiment, a machine implemented method is provided. The method includes generating a clone of a replicated copy of a database; assigning a new data block to the clone to replace a data block shared between the clone and the replicated copy; generating a new profile for the clone with the assigned new data block that is not shared between the clone and the replicated copy; and using the clone with the new profile as an independent database.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As used in this disclosure, the terms "component", "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system for using a clone of a replicated copy of a storage volume as an independent data structure (or data object) is provided. The replicated copy in this example may be that of a database and the cloned version is used as an independent database after segregating data blocks that are shared between the replicated copy and the clone. To replace the shared blocks, the clone is assigned new data blocks by the storage operating system. A new profile for the clone is generated where the clone does not share any data blocks with the replicated copy. This allows a user to use the cloned copy as an independent object, for example, as a database that is independent of the replicated copy. The profile includes an option to delete the clone profile and any associated data blocks thereof.

Figure 1A:
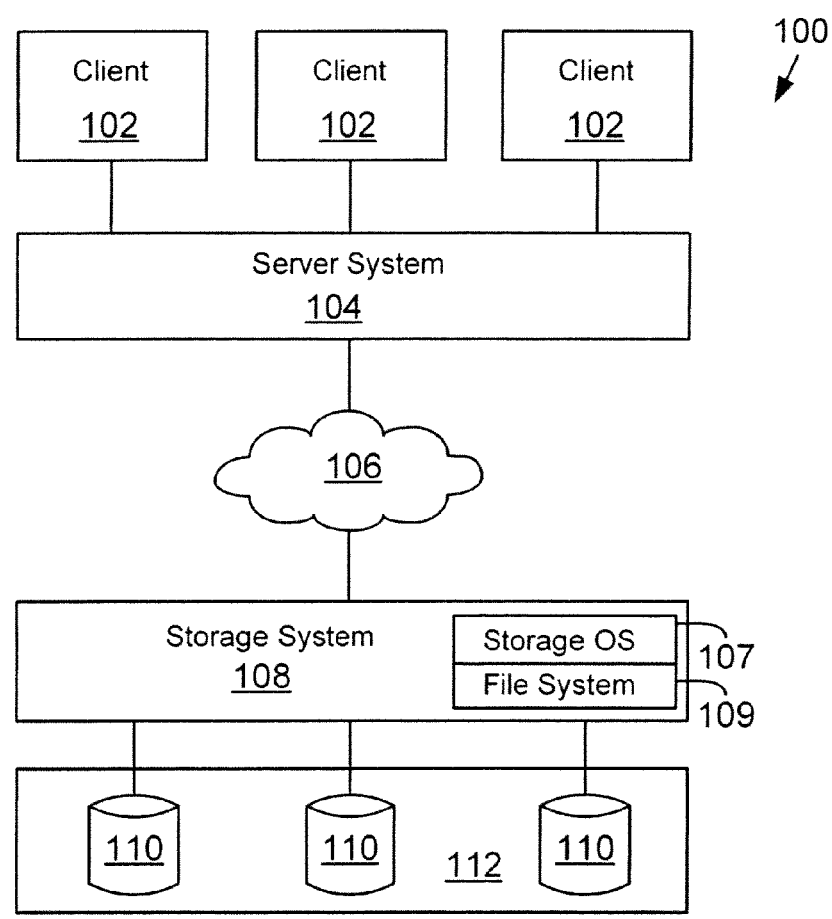
FIG. 1A shows an example of a storage environment using some of the various embodiments disclosed herein.

Storage Environment 100:

FIG. 1A is a block diagram of an exemplary storage environment 100 (may also be referred to as a storage operating environment) in which some of the embodiments disclosed herein are implemented. The storage environment 100 may include a computing system 104 (also referred to herein as server system 104 and/or host platform 102) that is accessible to a plurality of client computing systems 102 (may also referred to as user console 102, client systems 102 or client 102) operating as user consoles via a connection system (not shown) such as a Local Area Network (LAN), Wide Area Network (WAN), or the like.

Client systems 102 may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

The server system 104 may include a computing system for handling requests for data, electronic mail, file transfers, or other network services from client computing systems 102. The server system 104 may execute applications including host applications, such as backup and/or recovery type applications, database applications and others.

The storage environment 100 further comprises a storage system 108 having access to a set of mass storage devices 110 within a storage subsystem 112. Connection system 106 may directly couple server system 104 to storage system 108 or connection system 106 may be a local area network (LAN), a wide area network (WAN), metropolitan area network (MAN), the Internet or any other connection type.

The server system 104 utilizes services of the storage system 108 to store and manage information at storage devices 110. Server system 104 may request the services of the storage system 108, and the storage system 108 may return the results of the services requested by the server system 104, by exchanging packets over connection system 106. The server system 104 may issue packets using file-based access protocols, such as the Common Internet File System (CIFS) protocol or Network File System (NFS) protocol, over the Transmission Control Protocol/Internet Protocol (TCP/IP), when accessing information in the form of files and directories. Alternatively, the server system 104 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage system 108 executing a storage operating system 107 stores information at mass storage devices 110, preferably on one or more writable storage device media such as magnetic disks, video tape, optical, DVD, magnetic tape, non-volatile memory devices for example, flash memory devices and any other similar media adapted to store information, including data and parity information.

The storage operating system 107 can present or export data stored at storage devices 110 as a storage volume, or one or more qtree sub-volume units, to each of the client systems 102. Each volume may be configured to store data containers, for example, files, scripts, word processing documents, executable programs as well as structured and unstructured data. The term volume or storage volume as used herein means a logical data set which is an abstraction of physical storage, combining one or more physical mass storage devices or parts thereof into a single logical storage object. However, each volume can represent the storage space in one storage device, an aggregate of some or all of the storage space in multiple storage devices, a Redundant Array of Independent (or Inexpensive) Disks (RAID) group, or any other set of storage space.

The storage operating system 107 may implement a high-level module, such as a file system 109 (for example, a Write Anywhere File Layout (WAFL™) file system available from NetApp®, Inc., Sunnyvale, Calif.) (without derogation of any trademark rights of NetApp® Inc.), to logically organize information stored at storage devices 110 as a hierarchical structure of directories, files and blocks. For example, each "on-disk" file may be implemented as set of data structures, i.e., storage device blocks, configured to store information, such as the actual data for the file. These data blocks are organized within a volume block number (vbn) space (123, FIG. 1B) that is maintained by the file system 109. The file system 109 organizes the data blocks within the vbn space as a "logical volume"; each logical volume may be, although is not necessarily, associated with its own file system.

Information stored at storage devices 110 is typically backed up (or replicated) at one or more storage locations. A backup of a data container or a file system includes copying and storage of a directory and/or tree structure of the file system. A processor executable backup process may use image taking technology (e.g., the Snapshot™ technology provided by NetApp® Inc. to backup all or a portion of the file system. The image(s) can be used later during a restore process.

A snapshot is a persistent point in time (PPT) image of the active file system that enables quick recovery of data after data has been corrupted, lost, or altered. Snapshots can be created by copying the data at each predetermined point in time to form a consistent image. The terms snapshot and backup are used interchangeably throughout this specification. It is noteworthy that the adaptive embodiments described herein are not limited to using any particular imaging technology.

The snapshots of a storage volume may be duplicated or "cloned". The embodiments disclosed herein may use the Flexclone® technology provided by NetApp®, Inc. (without derogation of any trademark rights of NetApp® Inc.) to create a clone (may also be referred to herein as "Flexclone"). To create a clone, typically, storage operating system 107 first generates a snapshot copy (may also referred to as a "parent snapshot") of a storage volume. Thereafter, the clone is generated based on the snapshot copy.

Figure 1B:
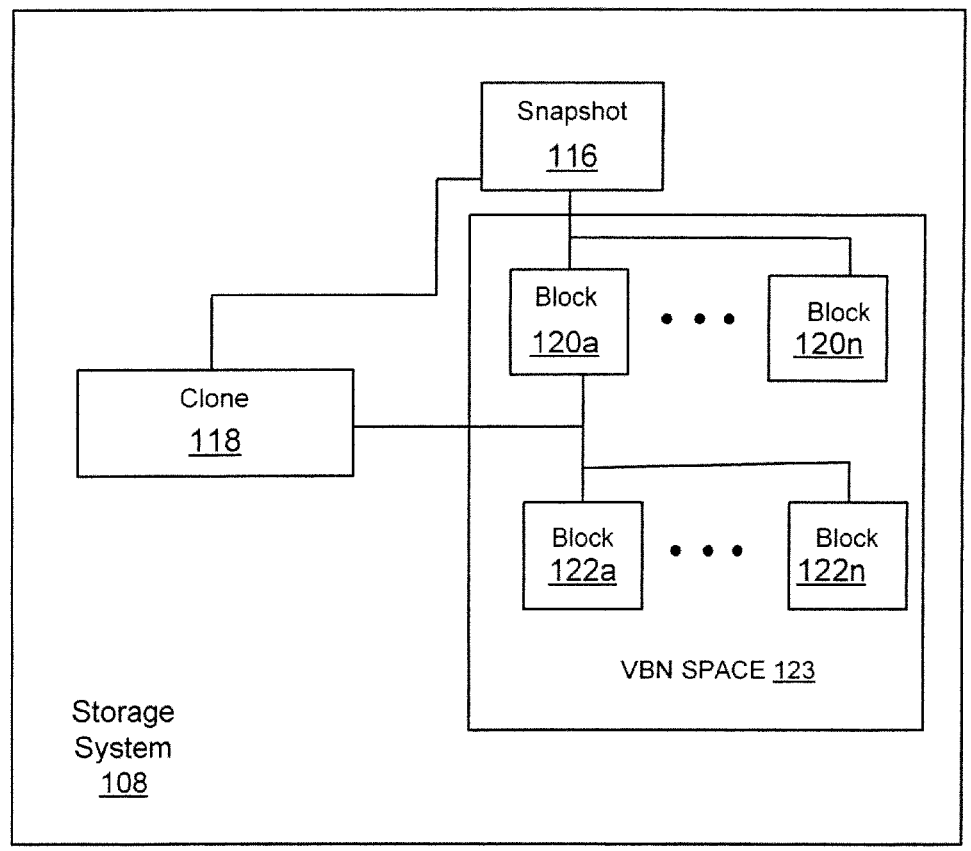
FIG. 1B shows an example of a snapshot clone sharing blocks with a snapshot.

Typically, clones are not used as an independent, standalone data structure/object (for example, a database) because they share data blocks with the snapshot. This is shown in FIG. 1B where a snapshot 116 is assigned blocks 120a-120n from vbn space 123 maintained by storage operating system 107 at a storage location (not shown). Clone 118 of snapshot 116 is assigned blocks 122a-122n and also shares some of the blocks 120a-120n with the snapshot 116.

The embodiments disclosed herein segregate the shared blocks by assigning new blocks to the clone. A profile for the clone with the assigned blocks is generated so that the clone can be used as an independent data structure/object, as described below in more detail. The term independent object as used herein means that the clone does not share any data blocks with the snapshot and can be used as a database/data structure, which is independent of the snapshot.

Figure 1C:
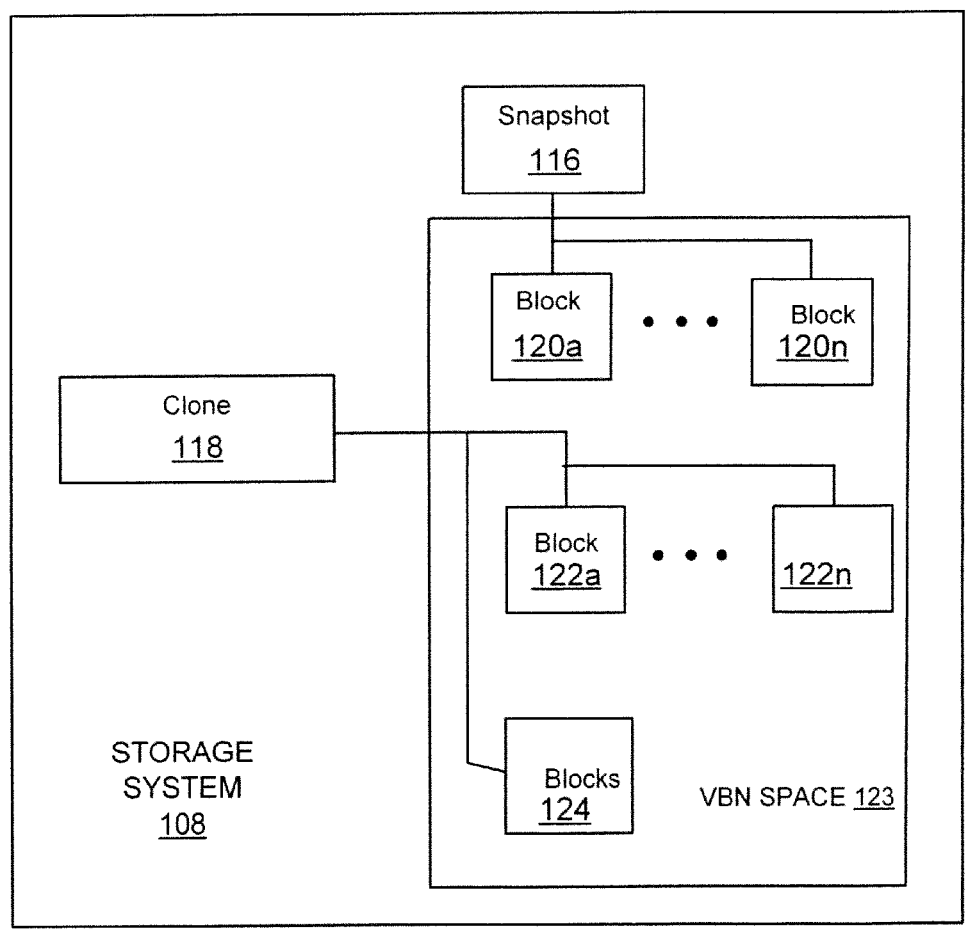
FIG. 1C shows an example of splitting the shared blocks of FIG. 1B, according to one embodiment.
Figure 1D:
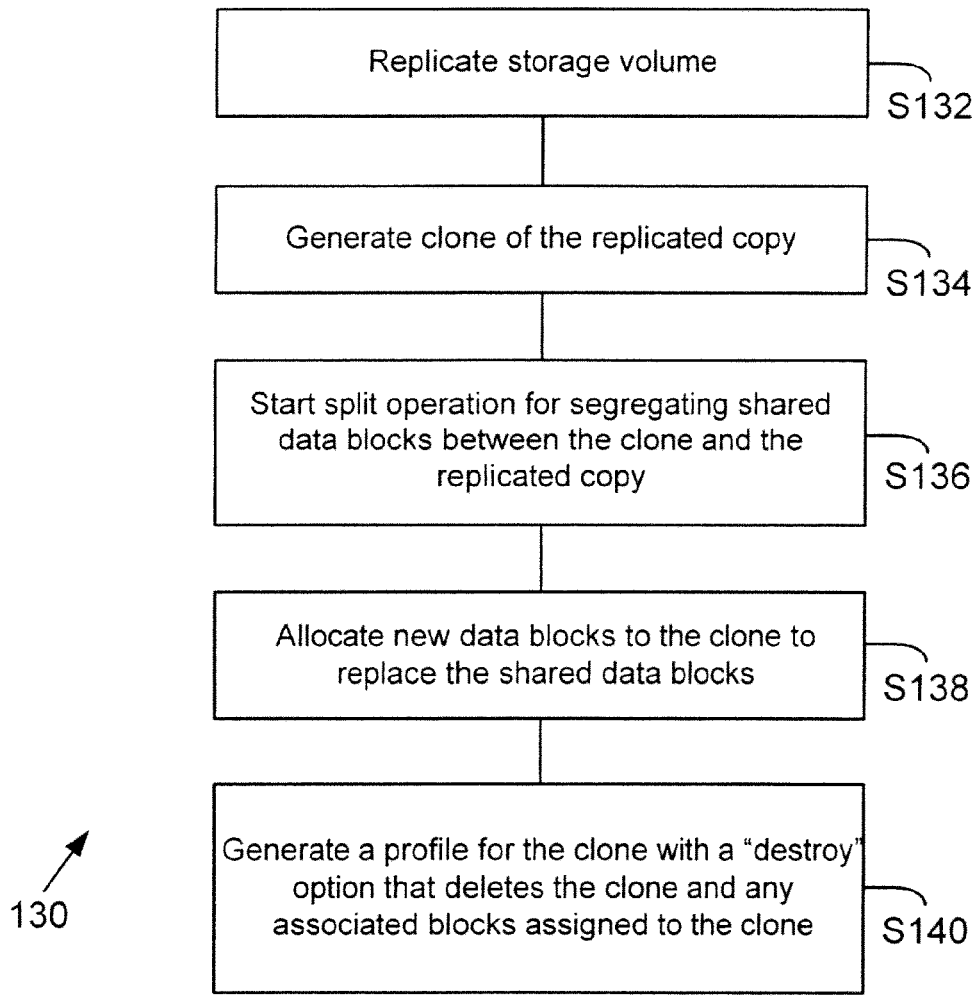
FIG. 1D shows a process flow diagram, according to one embodiment.

FIG. 1C shows an example of segregating shared blocks, according to one embodiment. Blocks 124 in vbn space 123 are assigned to clone 118 instead of blocks 120a-120n that are shared with the snapshot 116. After the blocks are segregated, clone 118 is assigned an independent profile described below in more detail with respect to process 130 of FIG. 1D.

Process 130 begins in block S132 when a storage volume is replicated. In one embodiment, a backup application, for example, SnapManager® (without derogation of any trademark rights of NetApp® Inc.), a program provided by NetApp® Inc. and executed by server 104 may initiate a replication operation. The file system 109 generates the snapshot 116 as shown in FIG. 1B. In block S134, the clone 118 is generated by file system 109. The clone 118 may share storage blocks 120a-120n with snapshot 116.

In block S136, a request to split the shared blocks is sent to storage operating system 107. This request may be sent by the SnapManager®. The split operation is performed in block S138 when new blocks (124, FIG. 1C) are assigned to clone 118.

The storage operating system 107 maintains a data structure (not shown) to track the blocks within vbn space 123. The data structure includes a unique identifier for identifying each block within the vbn space 123. The data structure stores an identifier identifying snapshot 116 and the blocks that are assigned to snapshot 116. The data structure also stores an identifier identifying the clone 118 and the blocks that are assigned to clone 118, including the shared blocks. When the new blocks are assigned to clone 118, the data structure is updated by the storage operating system 107 to indicate that the previously shared blocks are no longer being used for clone 118.

In block S140, a profile is generated for the clone with the newly assigned blocks 124. In one embodiment, the profile for the clone is generated by server 104 and stored at a memory location of a storage device. In one embodiment, the profile includes a "destroy" option, which when selected deletes the clone and the blocks assigned to clone 119. After the profile is deleted, server system 104 notifies the storage system 108. This allows the storage system 108 that manages vbn space 123 to re-use the blocks that were being used by the clone.

In one embodiment, because the clone does not share any blocks with the snapshot, it can operate as an independent object, for example, a database. This provides the user within an additional data structure/object that can be used for any reason. After the user has used the clone with the new profile, the user can delete the profile of the clone. When the profile is deleted, the blocks associated with the profile can be re-used by the storage system 108.

Figure 1E:
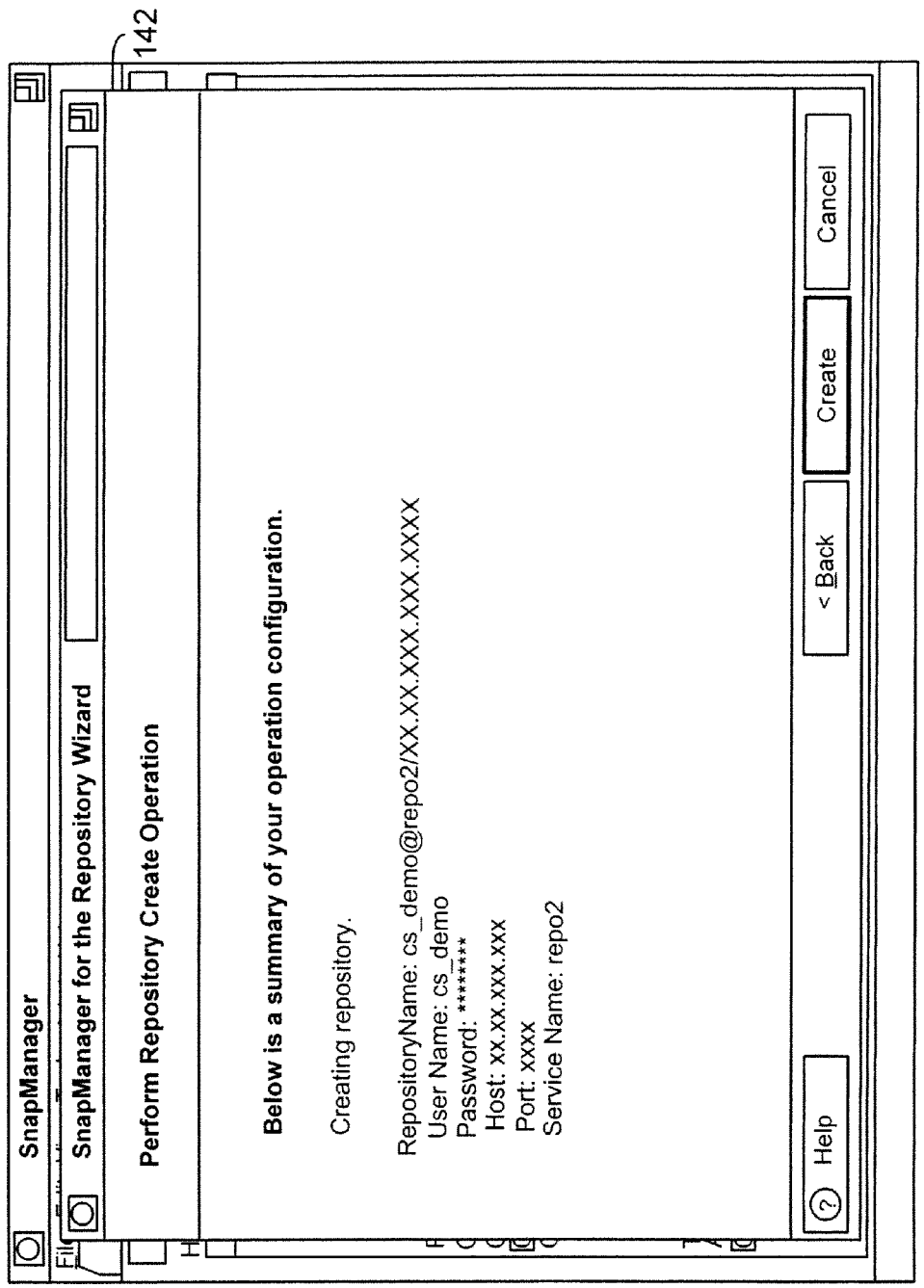
FIGS. 1E-1X show examples of managing storage space for snapshot clones, according to one embodiment.
Figure 1F:
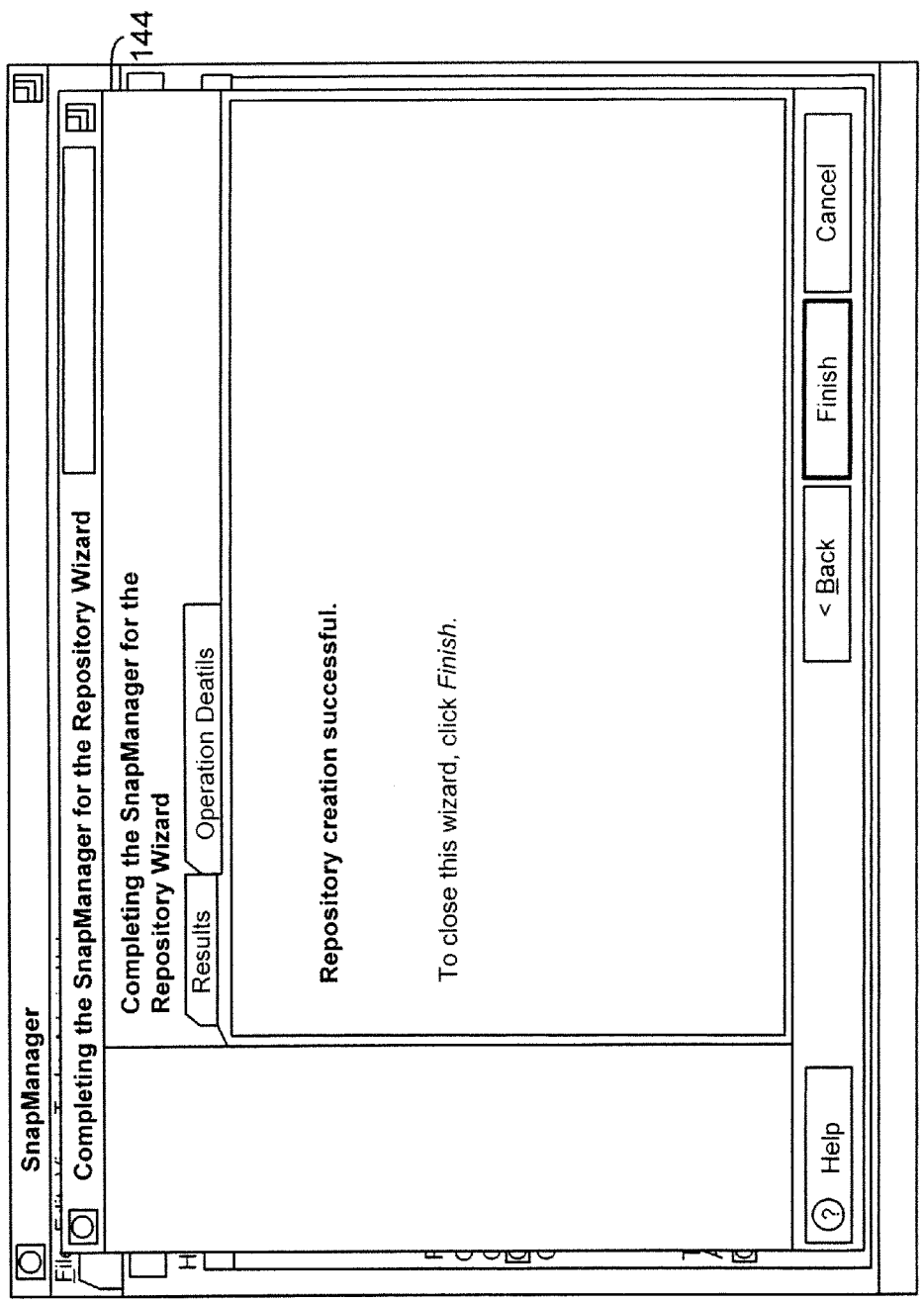
Figure 1G:
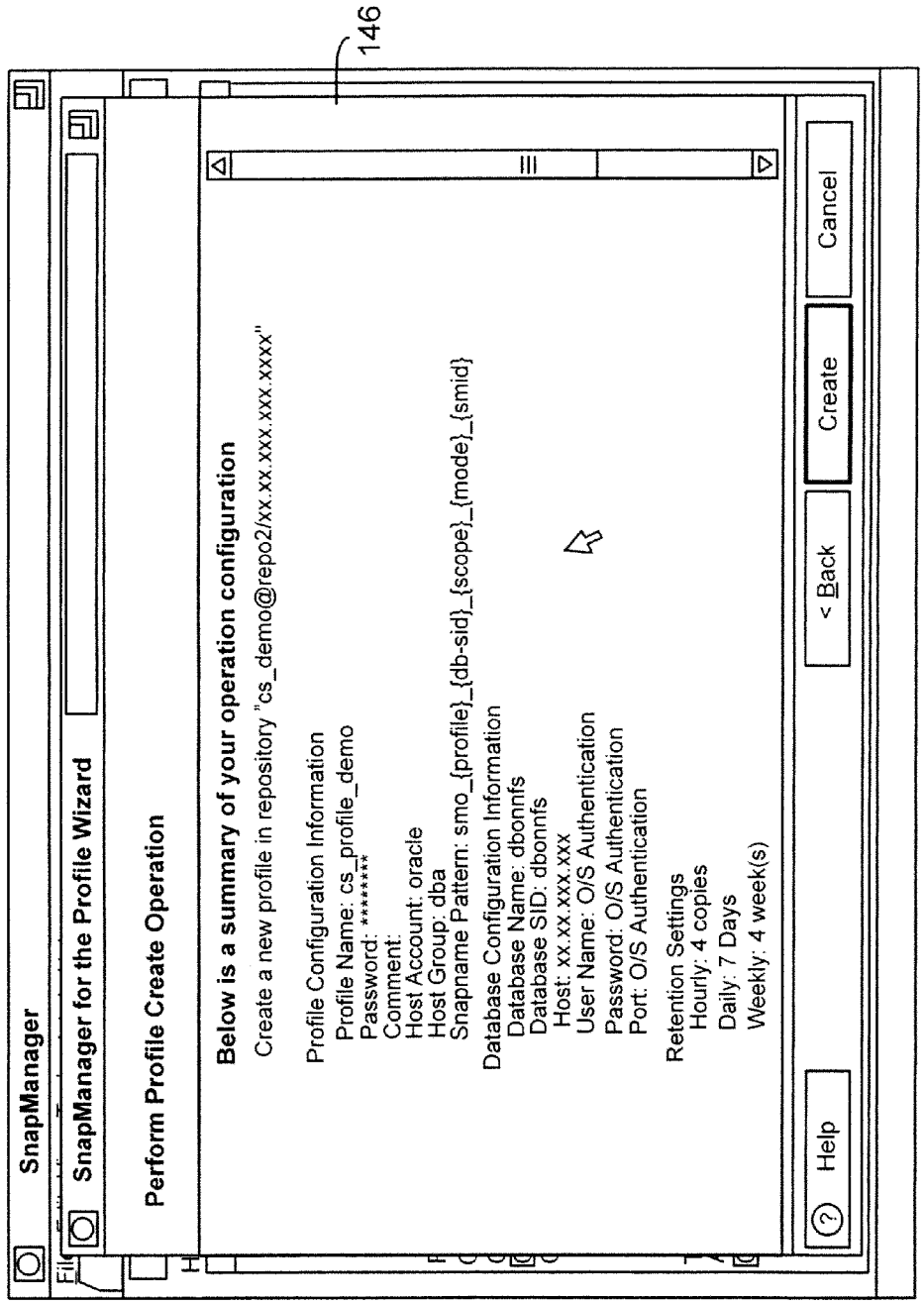
Figure 1H:
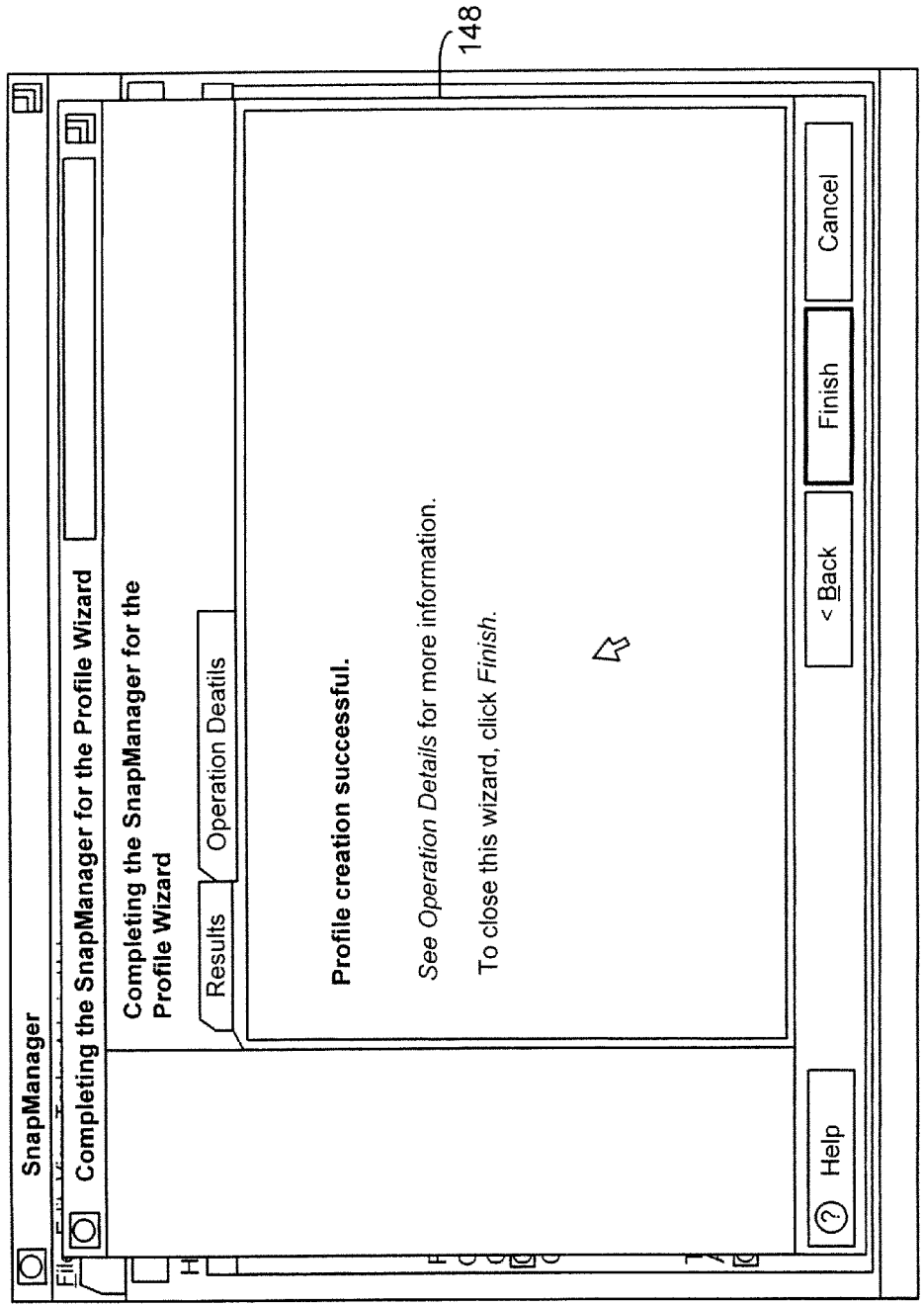
Figure 1I:
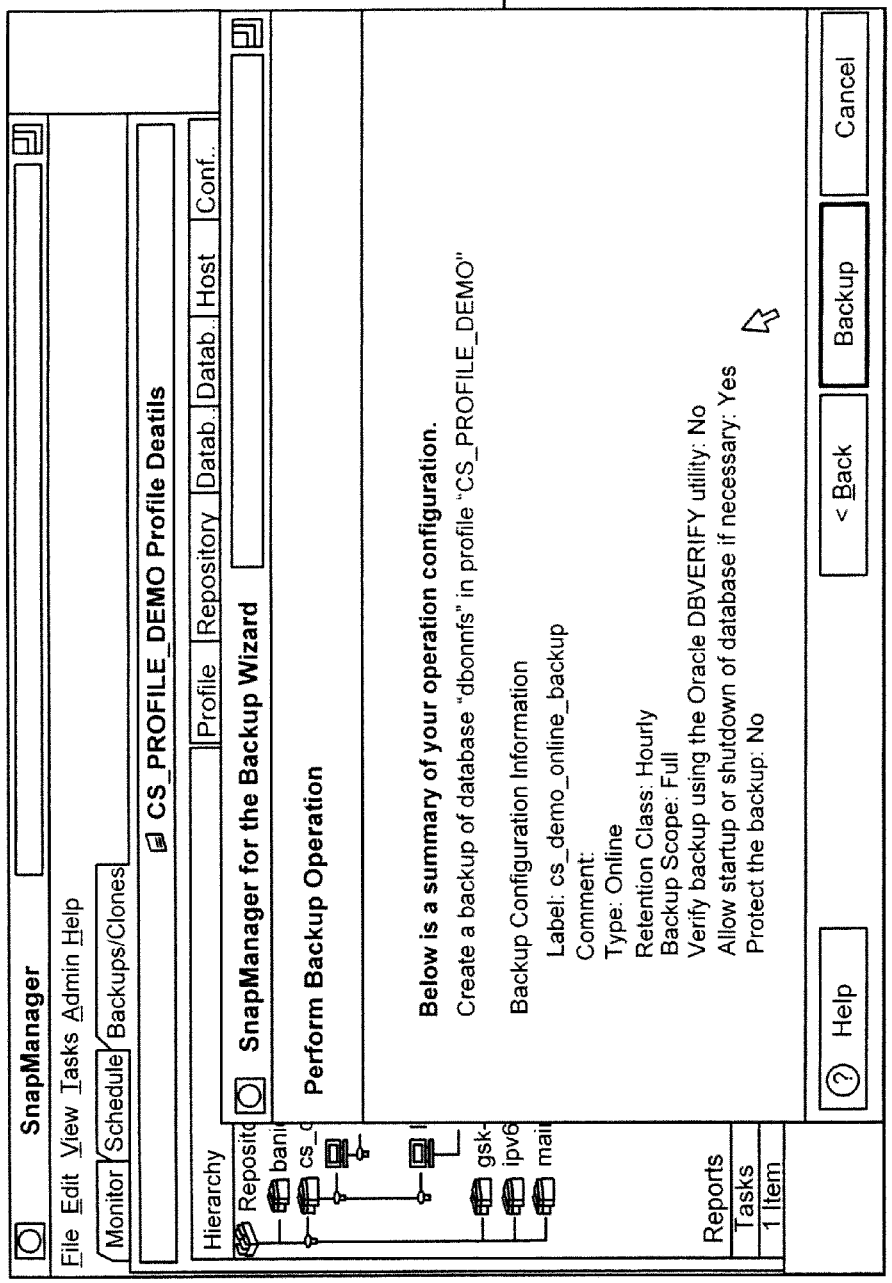
Figure 1J:
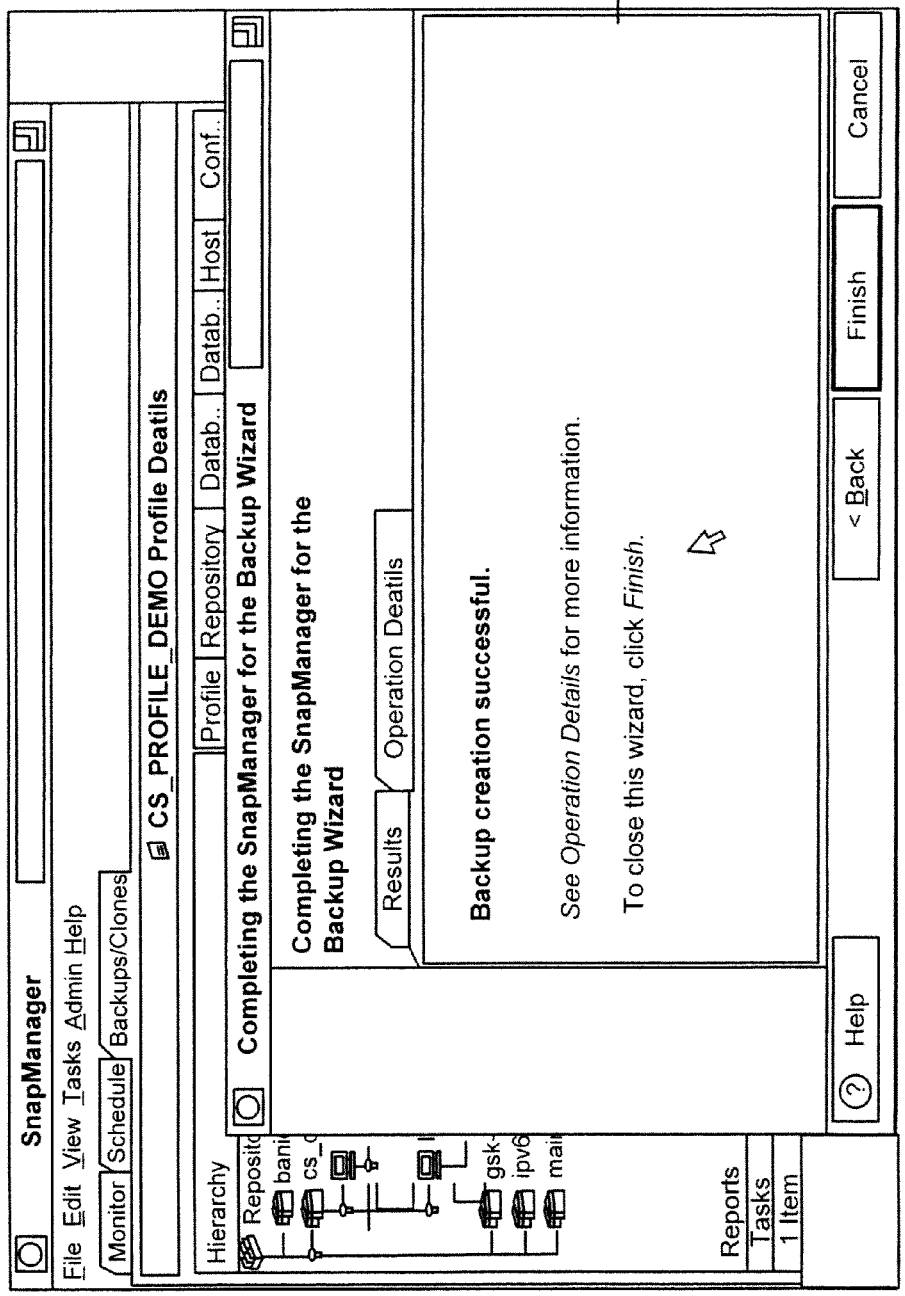
Figure 1K:
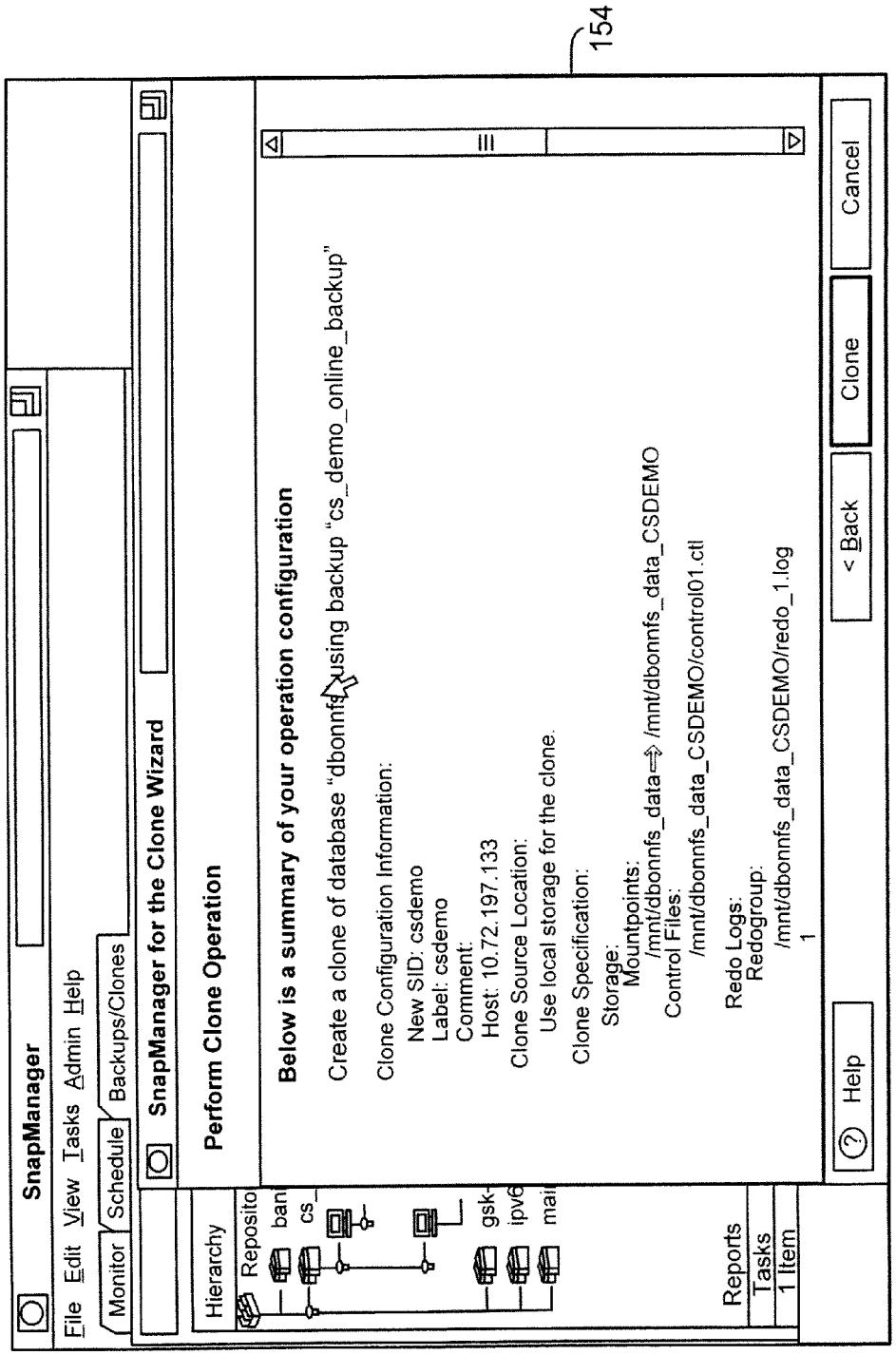
Figure 1L:
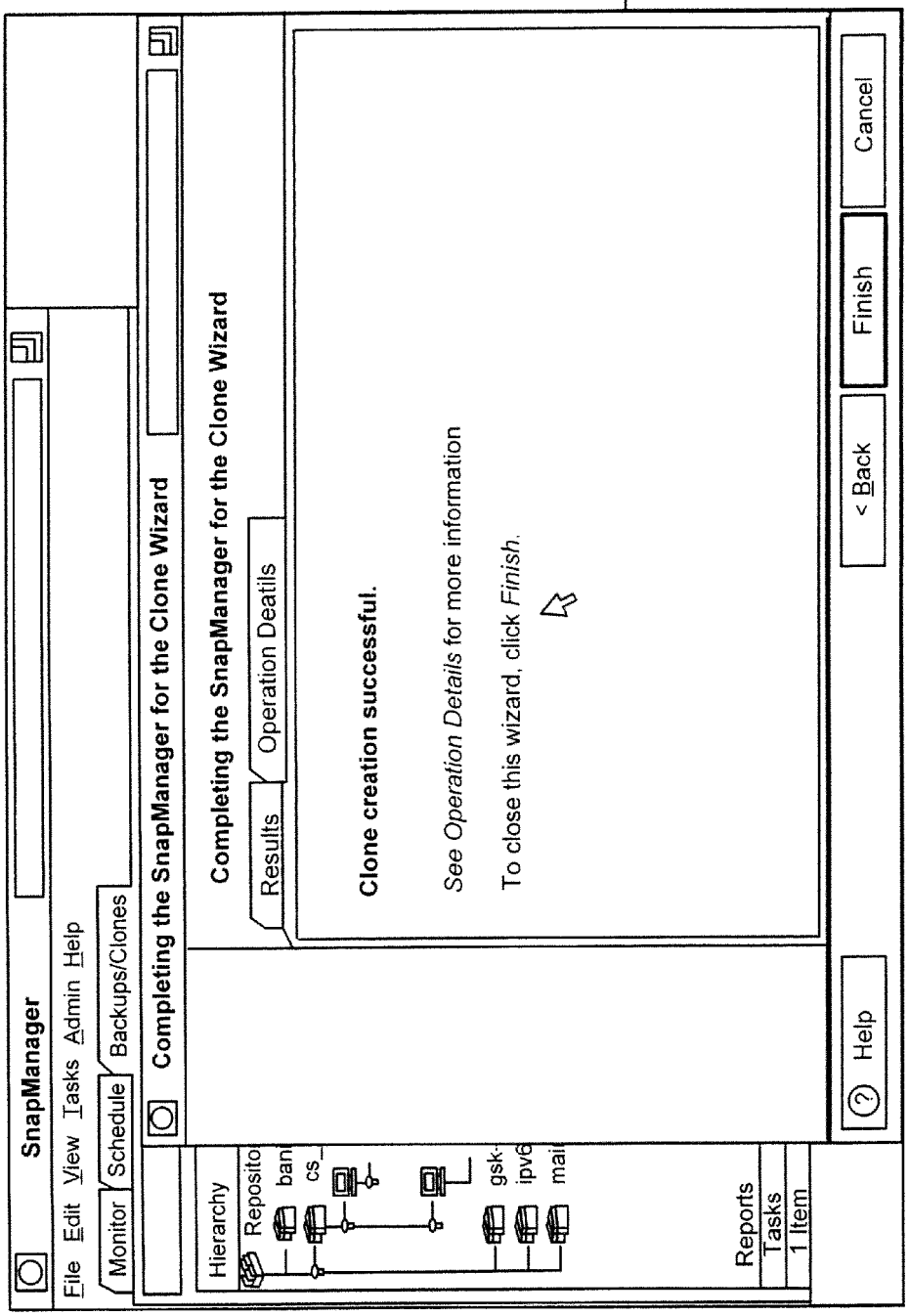
Figure 1M:
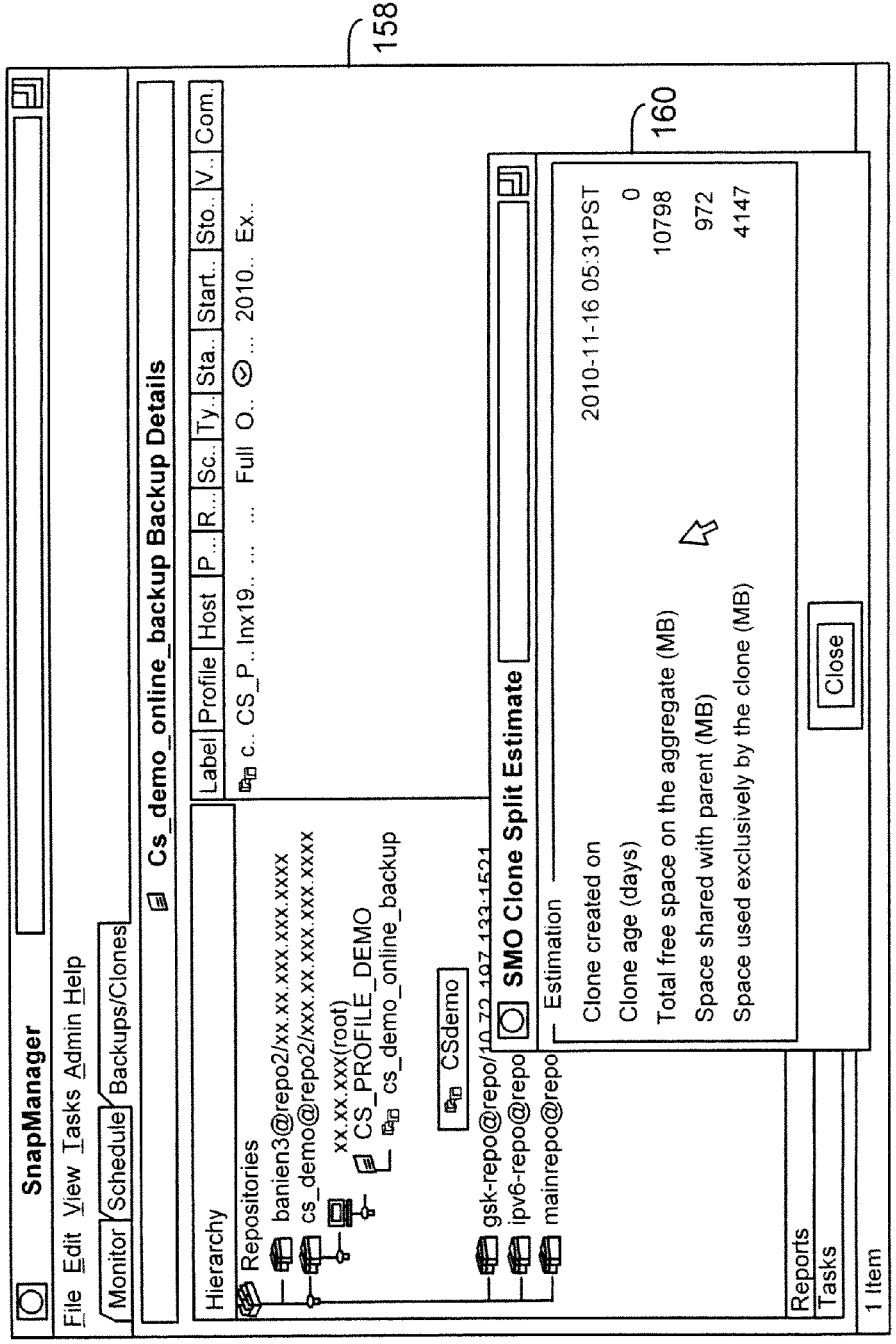
Figure 1N:
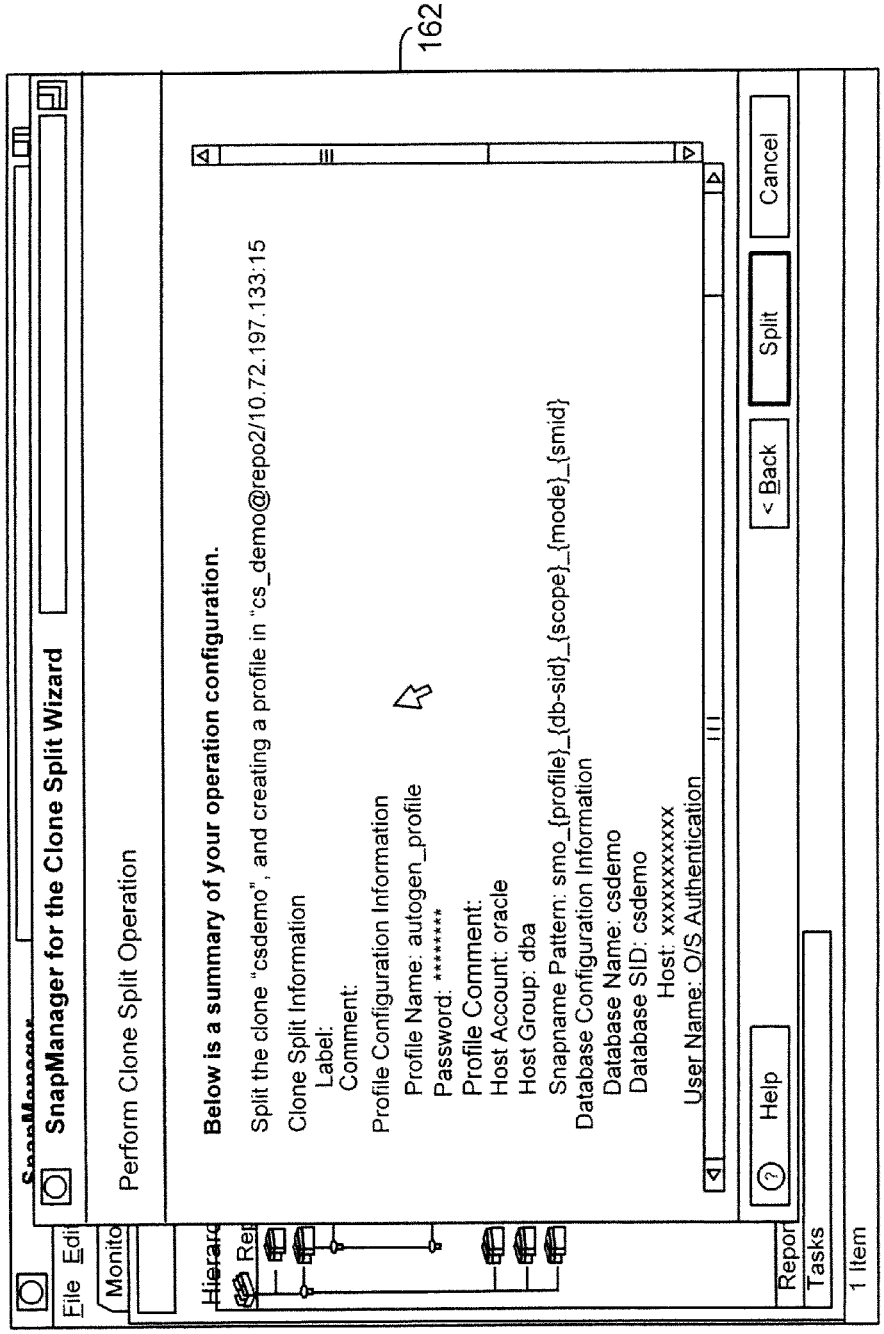
Figure 10:
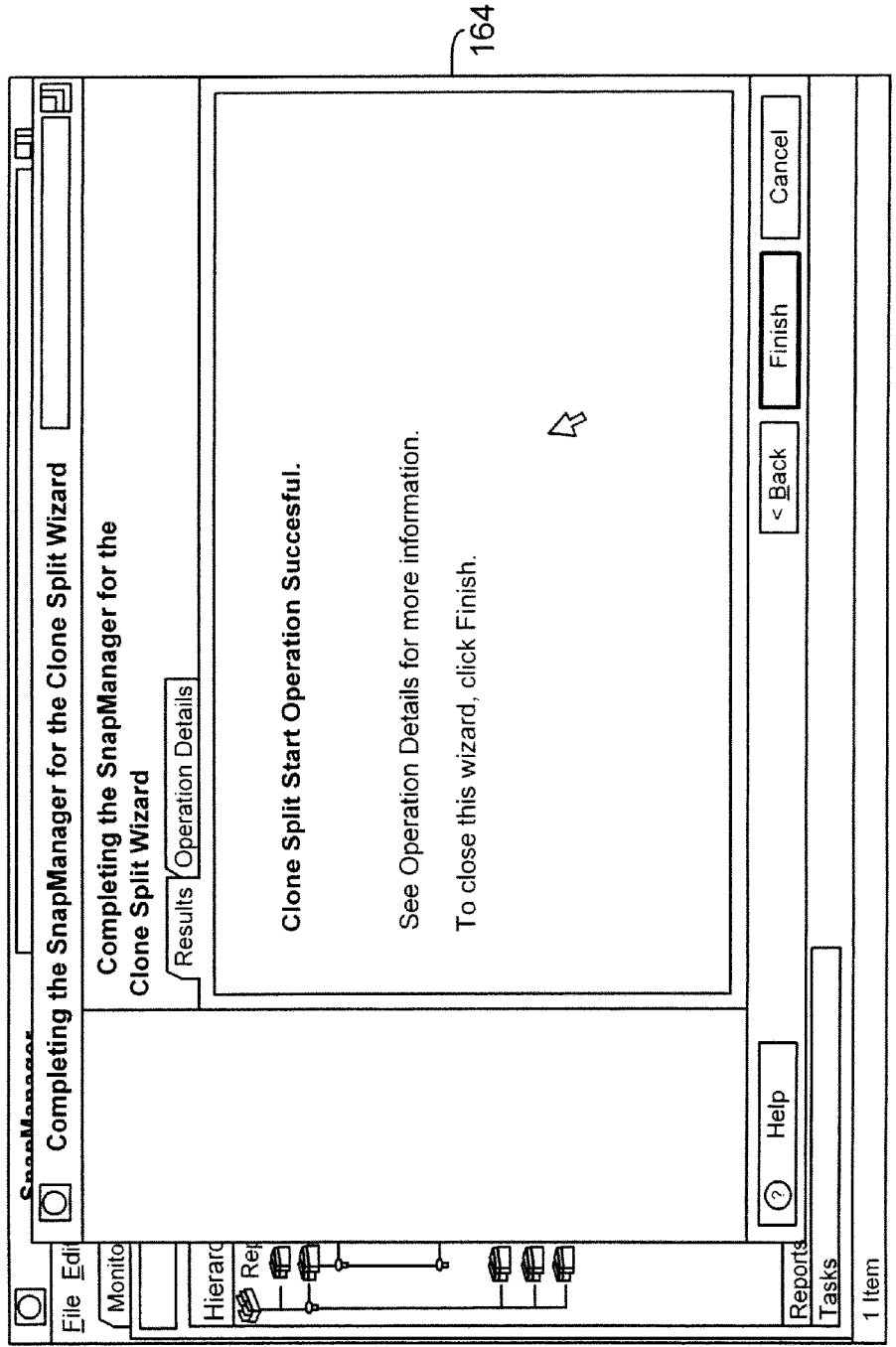
Figure 1P:
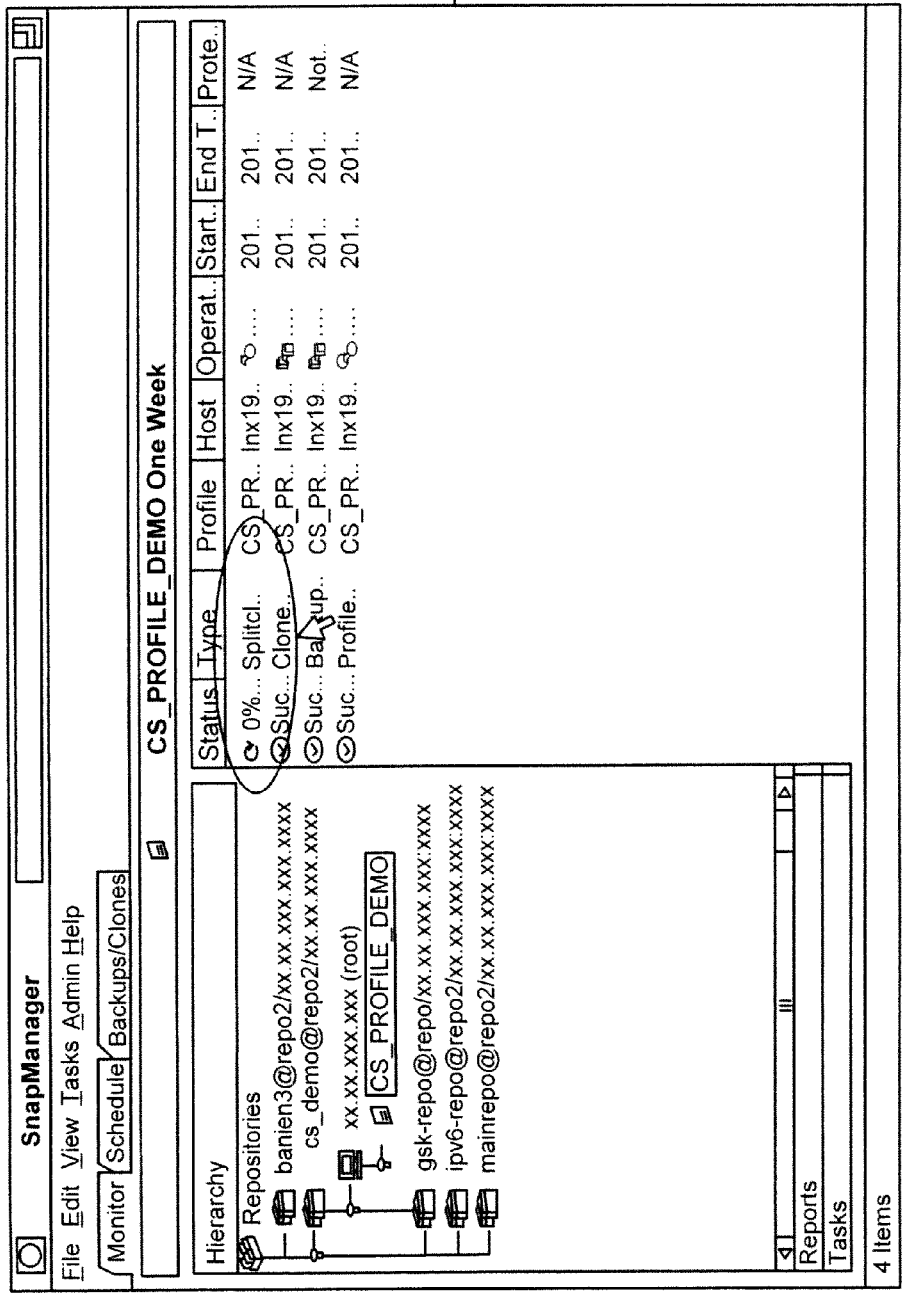
Figure 1Q:
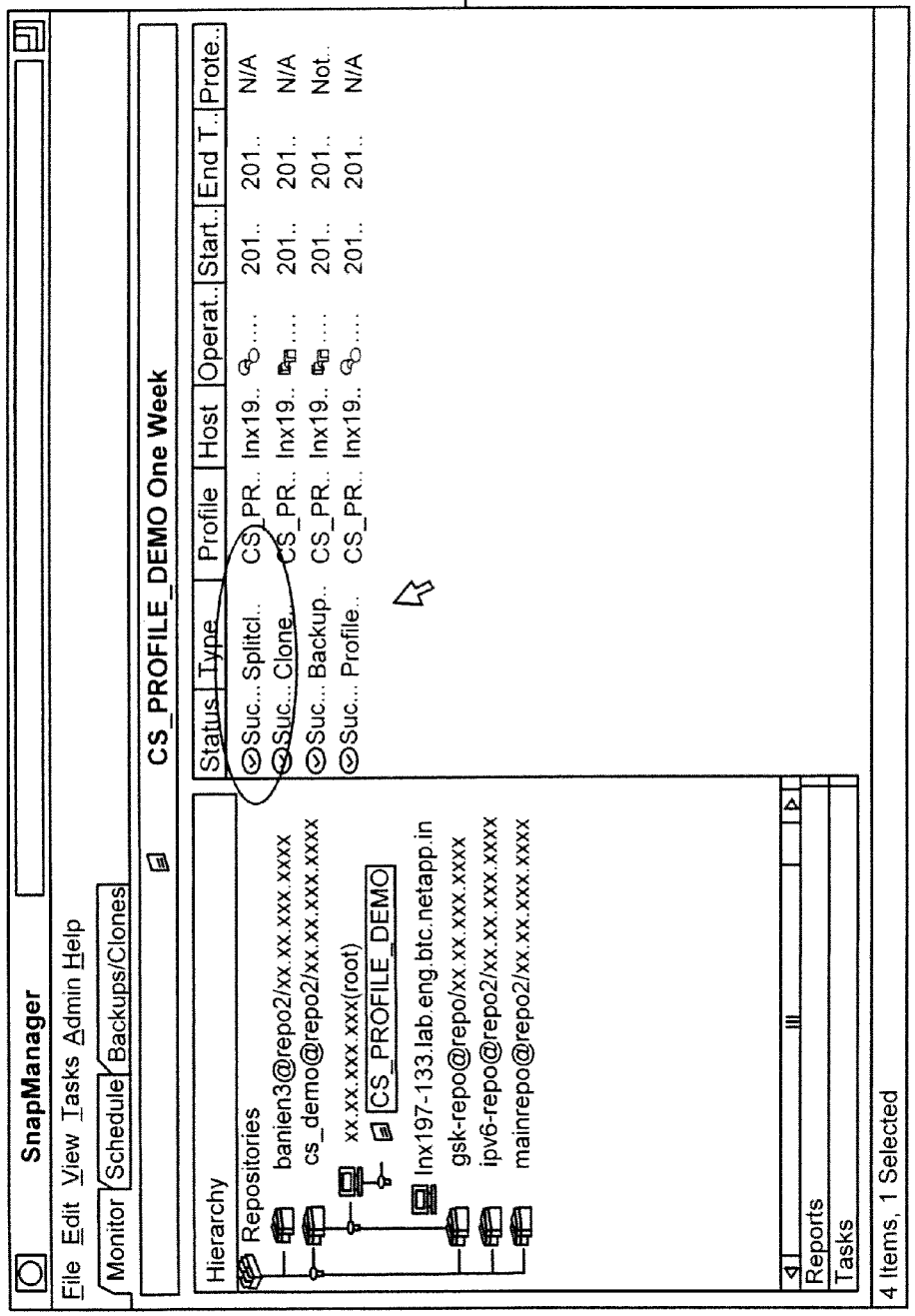
Figure 1R:
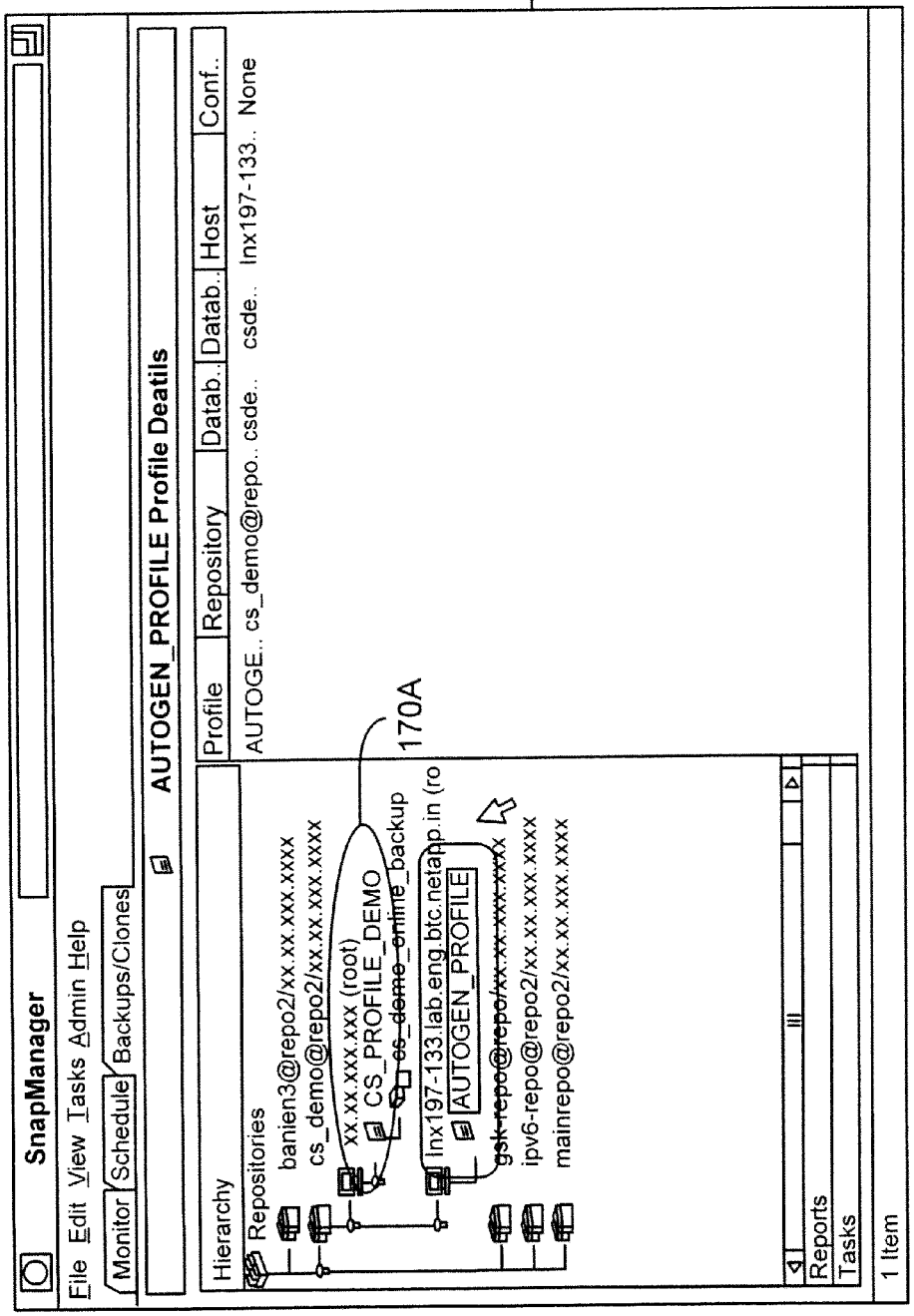
Figure 1S:
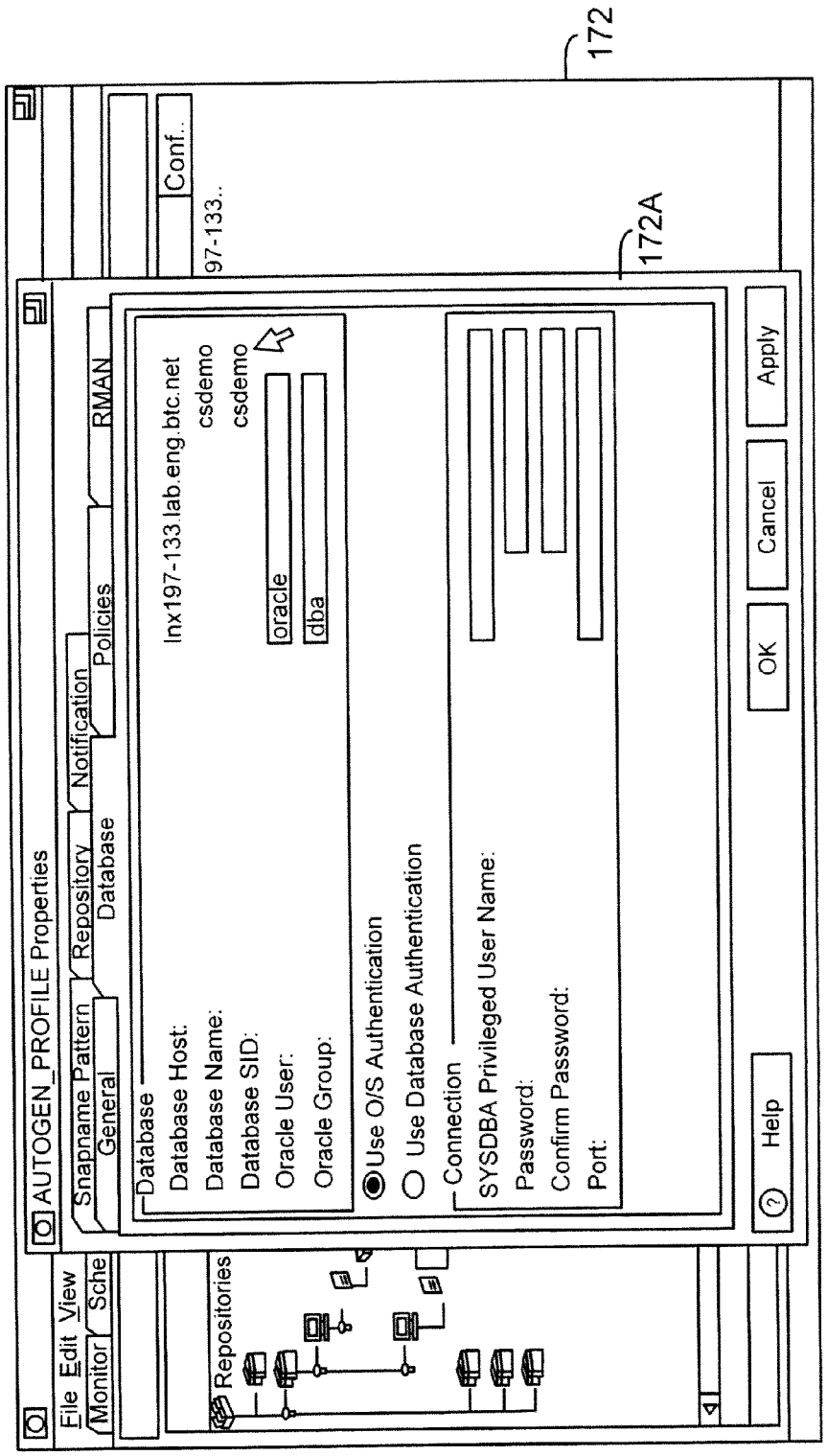
Figure 1T:
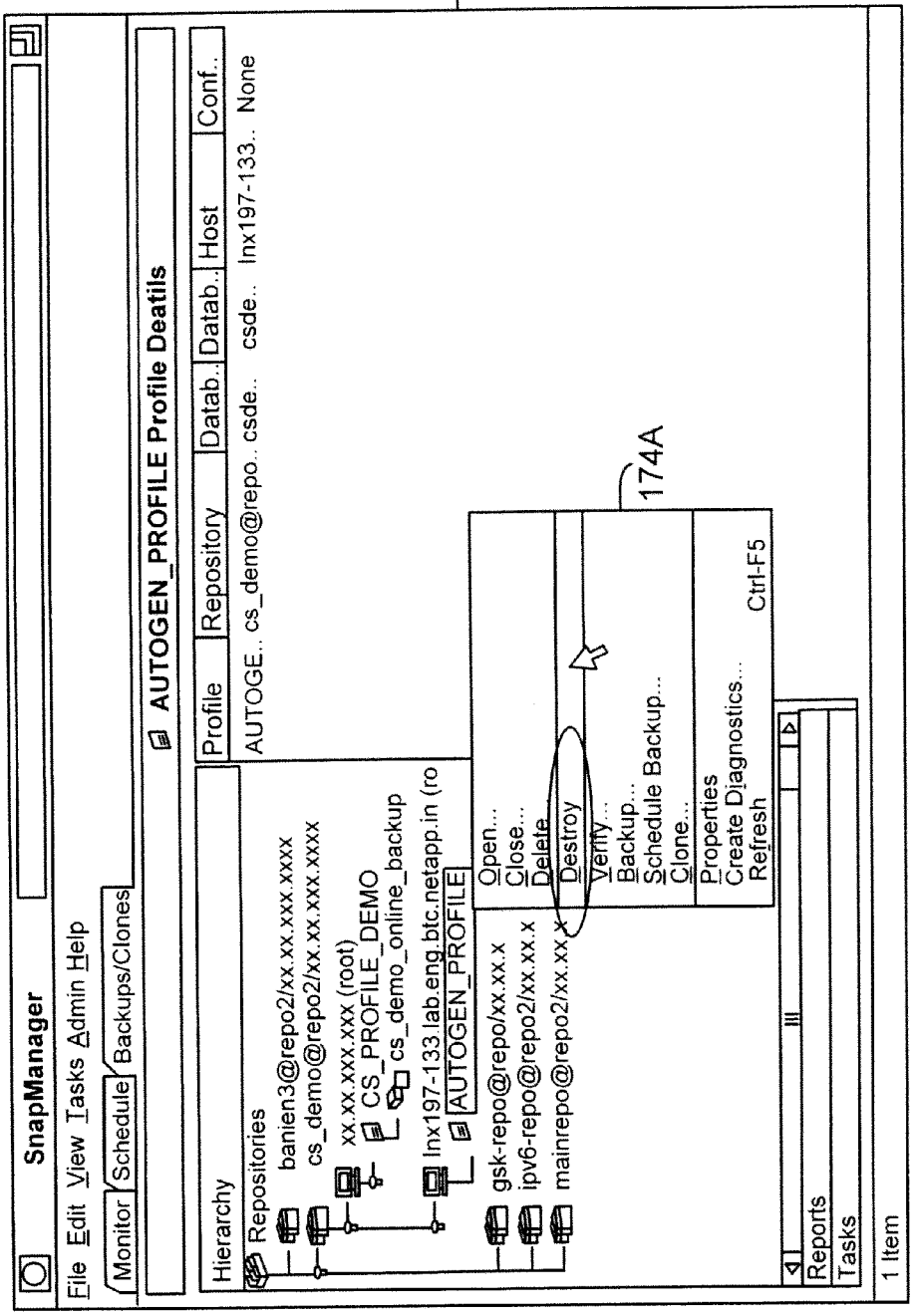
Figure 1U:
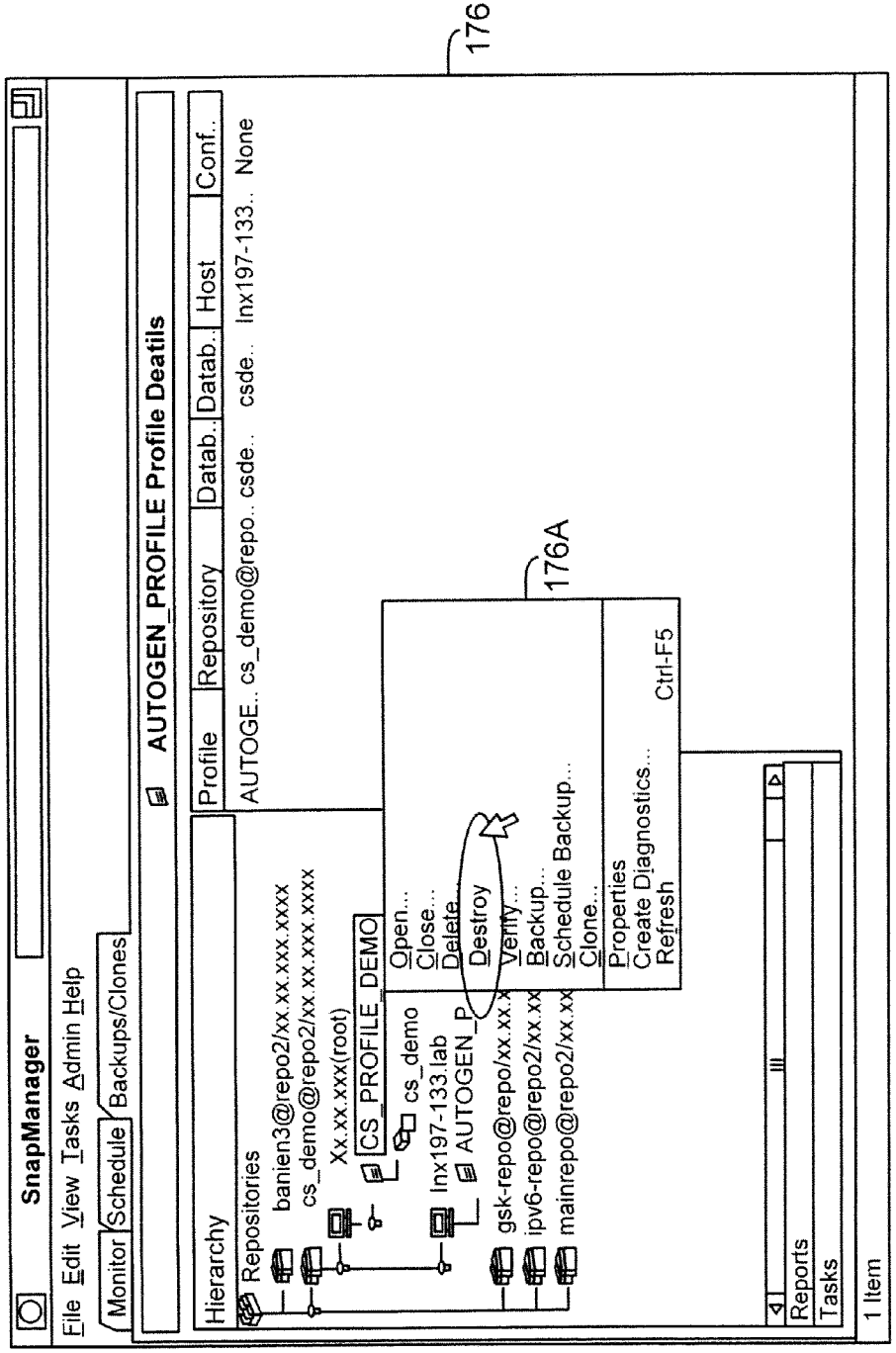
Figure 1V:
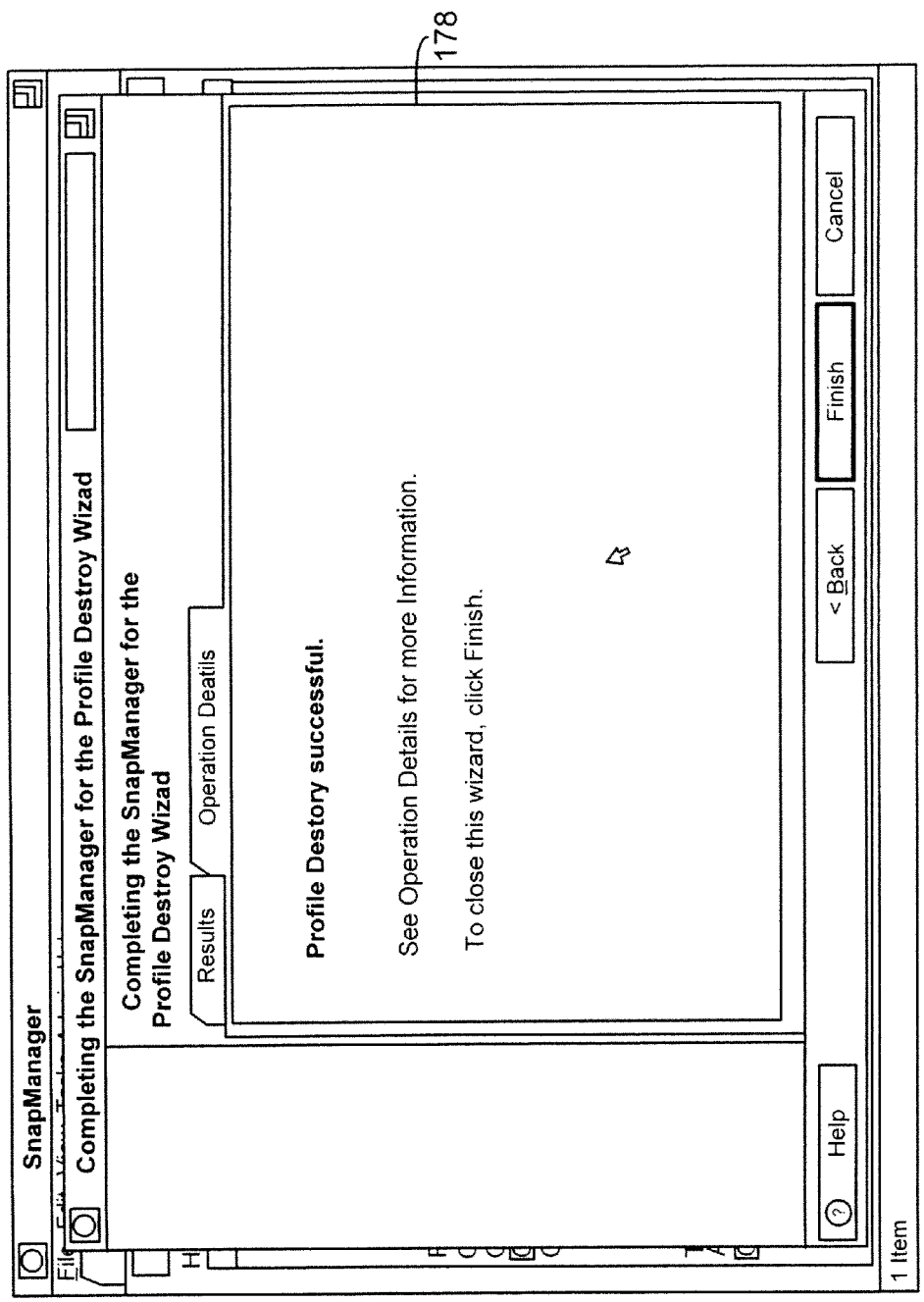
Figure 1X:
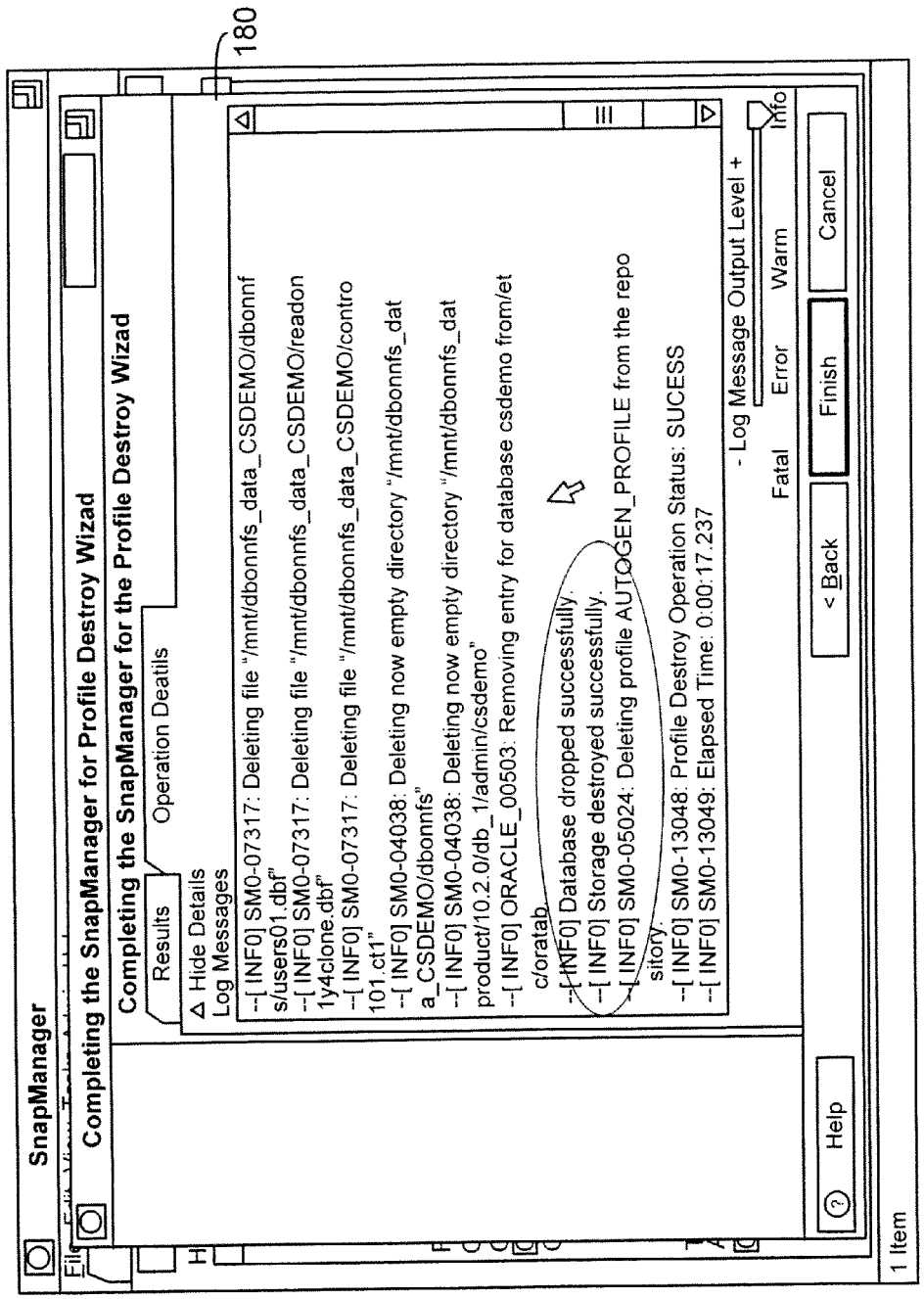

FIGS. 1E-1X show screen shots from a graphical user interface (GUI) displayed on a display device (not shown) for splitting blocks that are shared between a snapshot and its clone and then generating a profile with the destroy option, as described above with respect to the process flow of FIG. 1D. The GUI may be provided by server 104 on the display device to a user.

FIGS. 1E-1L illustrate an example of process blocks S132/S136 for generating a snapshot. In one embodiment, an operation to create a repository is shown within screen shot 142 of FIG. 1E. In one embodiment, screenshot 142 may be provided by a backup application, for example, SnapManager® executed by server system 104.

The repository is a data structure that may be used for storing information regarding various snapshots and other operations initiated by a backup application, for example, SnapManager® Screenshot 142 also shows the configuration information for creating the repository. In one embodiment, the operation to create the repository is completed by SnapManager®, as shown in screen 144 of FIG. 1F. An operation to create a profile for the repository is initiated within screen shot 146 of FIG. 1G. The operation to create the repository profile is completed as shown in screen 148 of FIG. 1H. In one embodiment, the operations of FIGS. 1G and 1H may be completed by SnapManager®.

FIG. 1I shows an example of configuring a backup operation in screenshot 150, according to one embodiment. The configuration parameters may be set by a user using a GUI that is presented by server system 104. The backup operation is completed as shown in screen shot 152 of FIG. 1J. Thereafter, a clone of the back-up copy is generated, based on a request from SnapManager® as shown in the screen shot 154 of FIG. 1K. The screenshot 154 shows the configuration information for the cloning operation. The cloning operation is completed as shown by the screenshot 156 of FIG. 1L. In one embodiment, the clone itself is generated by storage operating system 107.

FIG. 1M shows a screenshot 158 with clone details within window 160. The details include when the clone was created, the clone age, space that the clone shares with the snapshot and space that is unshared, i.e. used exclusively by the clone. This information may be obtained by SnapManager® from storage operating system 107.

FIG. 1N shows configuration of an operation for performing a split operation within screenshot 162, according to one embodiment. The configuration information identifies the clone, the type of profile that is to be created after the split operation (for example, the "auto_gen profile") and others. The process for configuring the split operation is completed as shown by the screenshot 164 of FIG. 1D. Screen shots 166 and 168 of FIGS. 1P and 1Q provide a status on the split operation from 0% to 100%. In one embodiment, the status is maintained by storage operating system 107 and then provided to SnapManager®. After the split operation is complete, the clone profile maybe accessed by selecting the option within 170a provided by screenshot 170 of FIG. 1R. The properties of the profile are shown within window 172a of screenshot 172 of FIG. 1S. The profile includes the name of the database and other relevant information.

The difference between a "normal" profile and an "auto_gen" profile is shown within windows 174A and 176A of screenshots 174 and 176, respectively of FIGS. 1T and 1U. In one embodiment, the auto_gen profile within window 174a includes the "destroy" option that allows the user to destroy the profile and release the data blocks associated with the profile. The normal profile within window 176a does not have this capability.

A profile destroy operation is shown within screenshot 178 of FIG. 1V. The results of the destroy operation may be viewed within screenshot 180 of FIG. 1X where the profile and the associated storage are destroyed successfully.

In one embodiment, a clone of a snapshot can be used as an independent data object (for example, a database) because the clone has a new profile with dedicated data blocks and does not share blocks with the snapshot. The data blocks for the clone are released when the clone profile is deleted, as described above.

Figure 2A:
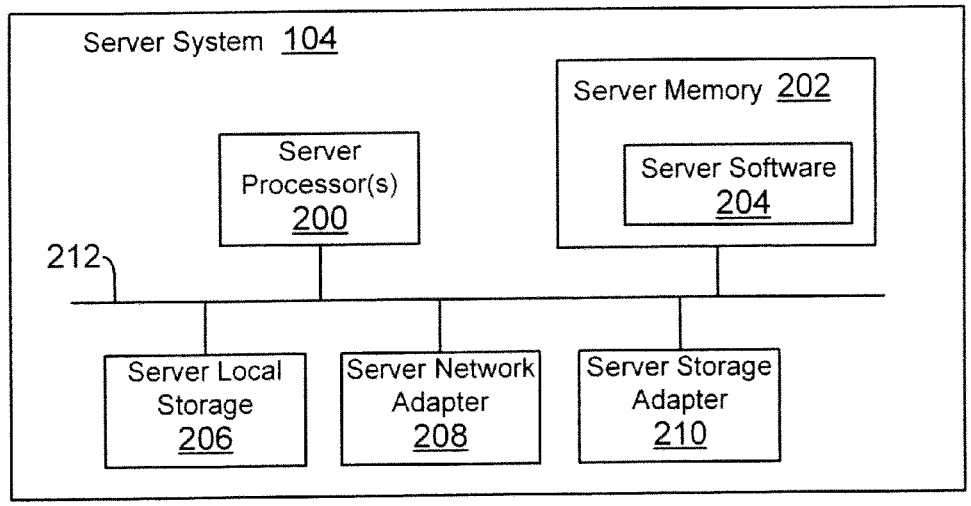
FIGS. 2A-2B show examples of a server based computing system used according to one embodiment.
Figure 2B:
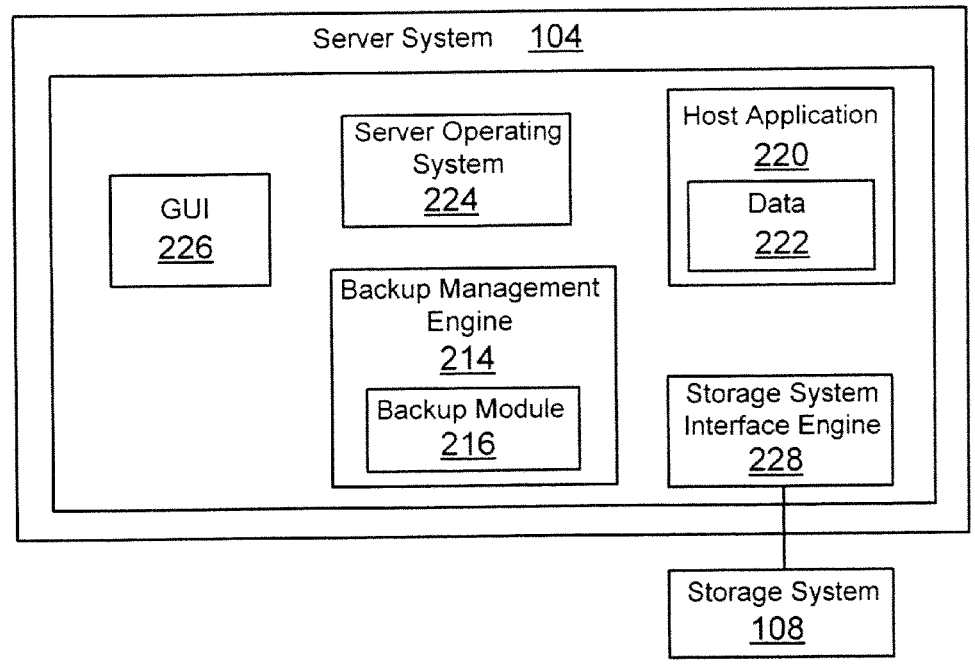

Server System:

Some of the embodiments disclosed herein may be implemented by or using the server system 104 that is now described in detail with respect to FIGS. 2A-2B. Note, certain standard components used by server system 104 that are not germane to the embodiments disclosed herein have not been described.

The server system 104 comprises server processor(s) 200, a server memory 202, a server network adapter 208, a server storage adapter 210, and a server local storage 206 coupled by a bus system 212. The bus system 212 is an abstraction that represents any one or more separate physical buses and/or point-to-point connections, connected by appropriate bridges, adapters and/or controllers. The bus system 212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The server processors 200 are the central processing units (CPUs) of the server system 104 and, thus, control the overall operation of the server system 104. In certain embodiments, the server processors 200 accomplish this by executing programmable instructions out of server memory 202. The server processors 200 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The server memory 202 comprises storage locations that are addressable by the processor 200 and adapters, for example, the server network adapter 208 and the server storage adapter 210. The storage locations are for storing executable instructions that preferably include server software 204. The server processor 200 and the server adapters may, in turn, comprise processing elements and/or logic circuitry configured to execute the programmable code and manipulate various data structures.

The server memory 202 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein.

The server network adapter 208 comprises a plurality of ports adapted to couple the server system 104 to one or more client systems 102 (shown in FIG. 1A) over point-to-point links, wide area networks, virtual private networks implemented over a public network (Internet) or a shared local area network. The server network adapter 208 thus may comprise the mechanical, electrical and signaling circuitry needed to connect the node to the network.

The server storage adapter 210 facilitates access to the storage devices 110 (shown in FIG. 1A). The server storage adapter 210 comprises a plurality of ports having input/output (I/O) interface circuitry that couples to the devices 110 over an I/O interconnect arrangement, such as a conventional high-performance, fibre channel (FC) link topology.

In one embodiment, server network adapter 208 and server storage adapter 210 may be integrated into a single converged adapter that can handle both network and storage traffic. An example of such a converged adapter is a Fibre Channel over Ethernet (FCOE) adapter.

The server system 104 also has access to local storage 206 which is a mass storage device that may store information within the server system 104, such as executable instructions 204 (also referred to as server software 204), the server operating system 224 (FIG. 2B) and/or data. The server system 104 loads server software 204 into the server memory 202 from which they are accessed by the server processors 200. The server local storage 206 may be or may include any conventional medium for storing large volumes of data in a non-volatile manner, such as one or more magnetic or optical based disks, flash memory and other types of storage devices.

FIG. 2B shows an example of an architecture used by the server system 104 of FIG. 2A. In some embodiments, the server system 104 executes a server operating system 224; one or more host application(s) 220, which may use data object 222 (for example, a database) (shown as data 222); a backup management engine 214 having or interfacing with a backup module 216; a GUI engine 226; and a storage system interface engine 228. GUI 226 may be used to provide the various user interface described above with respect to FIGS. 1E-1X.

The server operating system 224 includes executable instructions that are executed out of server memory 202 for managing host applications and other operations. The server operating system 224 can be, for example, UNIX®, Windows NT®, Linux®, or any other operating system.

The host application(s) 220 can be any application used for servicing client 102 requests. Host applications 220 may include a database management application, for example, an email application and other applications.

Information stored in storage devices 110 and managed by storage system 108 may be backed up by the backup management engine 214. The backup-management engine 214 using backup module 216 may initiate a backup of a file and/or file system e.g., by sending a command to the storage system 108 via the storage system user interface engine 228. The storage operating system 107 (shown in FIG. 1A) of storage system 108 generates one or more images relating to the file system to backup all or a portion of the file system e.g., a single file, multiple files, a drive, a disk, multiple drives or disks, and/or one or more volumes including multiple drives.

After the backup is performed, the storage operating system 107 notifies the backup management engine 214 that the backup operation is completed. For each backup, the backup management engine 214 may also cause the storage system 108 to generate backup information that is stored to the storage system 108. The backup information may be in the form of metadata, and may include information about a backup, for example, identification for the backup, a time stamp when the backup was performed, and filenames, directory locations on the storage device(s) 110, and/or the directory path where backups are stored. The backup information may be used later to restore the file system and/or portions thereof, for instance, in case of a system crash, data corruption, virus, or a similar occurrence.

In some embodiments, the backup management engine module 216 uses image taking technology (e.g., Snapshot™ technology provided by NetApp® Inc.) to backup all or a portion of the file system. In some embodiments, the backup module 216 includes the SnapManager® provided by NetApp® Inc. to take snapshots, as described above.

In some embodiments, the backup management engine 214 also includes a clone module (not shown) that implements clone technology (e.g., the Flexclone® technology provided by NetApp®, Inc.) for generating clones, according to one embodiment.

The storage system interface engine 228 may be configured to act as an interface between the server system 104 and the storage system 108. The storage system interface engine 228 communicates with the storage system 108 by using, for example, a Zephyr Application and Programming Interface (ZAPI) protocol. In particular, the storage system interface engine 228 interacts with the backup management engine 214 to receive and perform requests made by the backup management engine 214 by interacting with other software programs of the server system 104 or the storage system 108.

In some embodiments, the storage system interface engine 228 includes SnapDrive® (without derogation of trademark rights of NetApp® Inc.), a program provided by NetApp® Inc. for interfacing with the SnapManager® and the storage operating system that is described below. It is noteworthy that the adaptive embodiments described herein are not limited to using SnapDrive®, any other module may be used for interfacing with the storage operating system.

Figure 3:
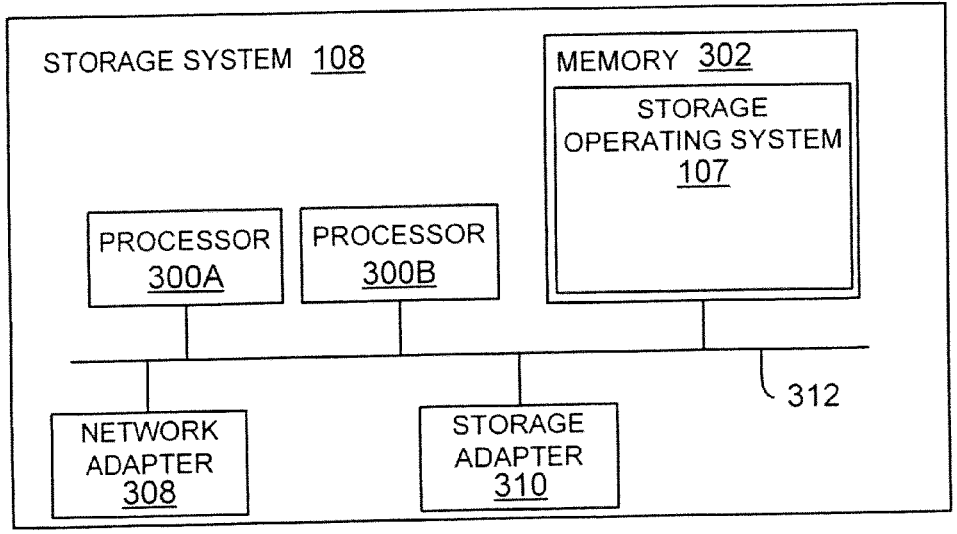
FIG. 3 shows an example of a storage system, used according to one embodiment.

Storage System:

FIG. 3 illustrates various components of the storage system 108, in accordance with some embodiments. Specifically, the storage system comprises one or more processors 300A and/or 300B, a memory 302, a network adapter 308, and a storage adapter 310 interconnected by a bus system 312. The bus system 312 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The storage system 108 executes the storage operating system 107 with the file system manager 109 out of memory 302. Memory 302 comprises storage locations that are addressable by the processors (300A/300B) and adapters (for example, 308 and 310) for storing software code and data structures. The processor and adapters may, in turn, comprise processing elements and/or logic circuitry configured to execute the software code and manipulate various data structures.

The network adapter 308 comprises a plurality of ports adapted to couple the storage system 108 to one or more server systems 104 over point-to-point links, wide area networks, virtual private networks implemented over a public network (Internet), or a shared local area network. The network adapter 308 thus may comprise mechanical, electrical and signaling circuitry.

The storage adapter 310 cooperates with the storage operating system 107 to access information requested by the server system 104. The storage adapter 310 comprises a plurality of ports having input/output (I/O) interface circuitry that couples to the disks over an I/O interconnect arrangement, such as a conventional high-performance, FC link topology.

In one embodiment, storage network adapter 308 and storage adapter 310 may be integrated into a single converged adapter that can handle both network and storage traffic. An example of such a converged adapter is a Fibre Channel over Ethernet (FCOE) adapter.

The storage operating system 107 portions of which are typically resident in memory 302 and executed by the processing elements, functionally organizes the storage system 108 by, inter alia, invoking storage operations in support of the storage service implemented by the storage system 108. It will be apparent to those skilled in the art that other processing and memory means, including various computer readable media, may be used for storing and executing program instructions pertaining to the invention described herein. As illustrated, the storage operating system 107 may comprise the Data ONTAP® operating system available from NetApp® Inc. that implements the WAFL® file system. However, it is expressly contemplated that any appropriate file system may be enhanced for use in accordance with the inventive principles described herein. As such, where the term "WAFL" is employed, it should be taken broadly to refer to any file system that is otherwise adaptable to the teachings of this invention. As used herein, the term "storage operating system" generally refers to the computer-executable code operable on a computer that manages data access.

In one embodiment, storage system 108 may have a distributed architecture; for example, it may include a separate N-("network") blade and D-(disk) blade (not shown). In such an embodiment, the N-blade is used to communicate with server system 104, while the D-blade includes the file system functionality and is used to communicate with the storage devices 110 that are a part of a storage sub-system. The N-blade and D-blade communicate with each other using an internal protocol. Alternatively, storage system 108 may have an integrated architecture, where the network and data components are all contained in a single box. The storage system 108 further may be coupled through a switching fabric to other similar storage servers (not shown) which have their own local storage subsystems. In this way, all of the storage subsystems can form a single storage pool, to which any client of any of the storage servers has access.

Figure 4:
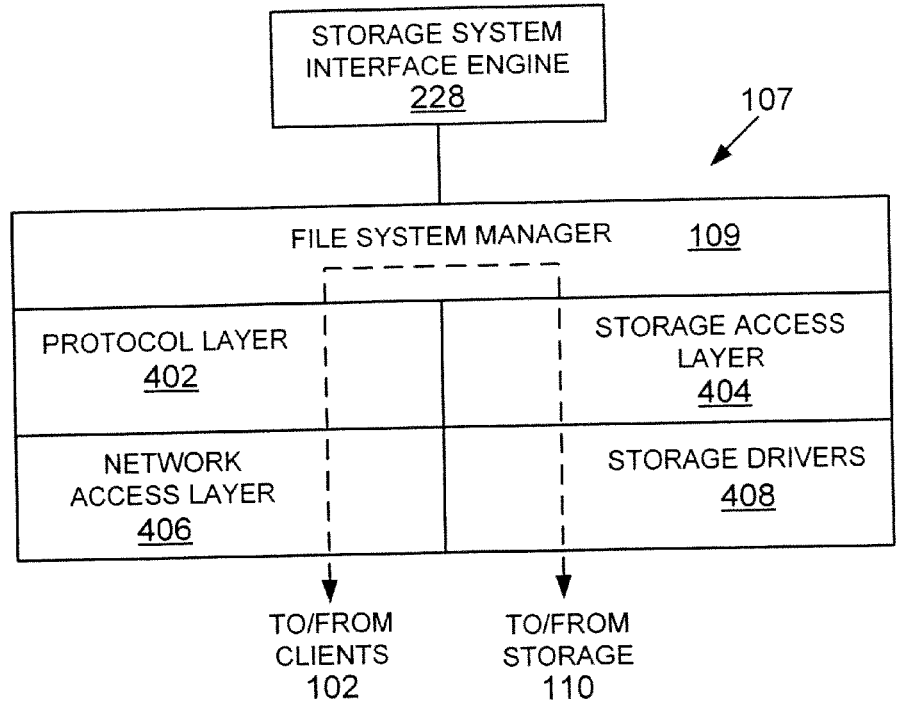
FIG. 4 shows an example of an operating system for the storage system of FIG. 3.

Storage Operating System:

FIG. 4 illustrates a generic example of an operating system 107 executed by storage system, according to one embodiment of the present disclosure. In one example, operating system 107 may include several modules, or "layers". These layers include the file system manager 109 that keeps track of a directory structure (hierarchy) of the data stored in storage devices and manages read/write operations, i.e. executes read/write operations on storage devices.

Operating system 107 may also include a protocol layer 402 and an associated network access layer 406, to allow storage system 108 to communicate over a network with other systems, such as server system 104. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between client systems 102/server 104 and mass storage devices 110 are illustrated schematically as a path, which illustrates the flow of data through operating system 107.

The operating system 107 may also include a storage access layer 404 and an associated storage driver layer 408 to allow storage system 108 to communicate with a storage device. The storage access layer 404 may implement a higher-level disk storage protocol, such as RAID while the storage driver layer 408 may implement a lower-level storage device access protocol, such as FC or SCSI.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Thus, a method and apparatus for managing snapshot clones have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
generating a replicated copy of a storage volume;
wherein the storage volume is managed by a storage operating system of a storage system;
wherein the storage operating system interfaces with a back-up application executed by a processor of a server; and
wherein the storage volume is replicated using a graphical user interface (GUI) provided by the back-up application;
creating a clone of the replicated copy using the back-up application;
displaying, via the GUI, properties of the clone including storage space used exclusively by the clone and storage space shared between the clone and the replicated copy;
configuring a clone split operation using the back-up application for splitting the clone from the replicated copy by selecting, from a plurality of profile types, one profile type for a split clone that will be generated by the clone split operation;
wherein the plurality of profile types includes a first profile type that allows a profile of the split clone to be deleted via the back-up application and a second profile type that does not allow the profile to be deleted via the back-up application;
sending, from the back-up application to the storage operating system, a request to split the clone from the replicated copy;
in response to the request, the storage operating system executing the split operation and assigning a new data block to the clone to replace a data block shared between the replicated copy and the clone;
obtaining, by the back-up application a status on progress of the split operation from the storage operating system;
displaying the status via the GUI;
upon completion of the split operation, the back-up application generating a profile of the split clone with the assigned new data block that is not shared with the replicated copy;
wherein the profile of the split clone is independent of any profile of the replicated copy and the profile of the split clone includes an indicator indicating whether the profile is of the first profile type or the second profile type; and
when the profile type for the profile is the first profile type, providing an option to a user to automatically delete the profile of the split clone via the GUI;
receiving a selection of the option via the GUI; and
sending an instruction from the back-up application to the storage operating system to release any data blocks associated with the profile of the split clone such that the data blocks can be re-used by the storage operating system.

2. The method of claim 1, further comprising:
deleting the profile of the split clone using the GUI, when the profile is of the first profile type and the back-up application notifying the storage operating system that the profile for the split clone has been deleted.

3. The method of claim 2, wherein the back-up application displays results of deleting the profile and associated data blocks.

4. The method of claim 1, wherein the split clone with the new data block operates as a database.

5. The method of claim 1, wherein the storage operating system maintains a data structure showing what data blocks are shared between the clone and the replicated copy.

6. The method of claim 1, wherein the back-up application maintains a data structure for storing attributes of the profile of the split clone.

7. The method of claim 6, wherein the data structure is stored as part of a repository maintained by the back-up application for storing information regarding operations initiated by the back-up application.

8. The method of claim 1, wherein the properties of the clone are displayed by the back-up application includes a clone age.

9. The method of claim 1, wherein the back-up application obtains information for the properties of the clone from the storage operating system.

10. A system, comprising:
a computing system interfacing with a storage system having a processor for executing a storage operating system;
wherein a processor of the computing system executes a back-up application out of a memory for:
configuring a split clone operation for splitting a clone from a replicated copy of a storage volume managed by the storage operating system by providing a profile type from a plurality of profile types for a split clone that will be generated after the clone split operation;
wherein the plurality of profile types include a first profile type that allows a profile of the split clone to be deleted via the back-up application and a second profile type that does not allow the profile to be deleted via the back-up application;
creating the profile for the split clone, after the clone is split from the replicated copy in response to a request from the back-up application to the storage system and a new data block is assigned to the clone by the storage operating system to replace a data block shared between the clone and the replicated copy; and
wherein the profile of the split clone is independent of any profile of the replicated copy and includes an indicator to indicate whether the profile of the split clone is of the first profile type or the second profile type and when the profile type for the profile is of the first profile type, the profile of the split clone can be automatically deleted via a user interface provided by the back-up application such that any data blocks associated with the split clone can be reused by the storage operating system for storing information for other objects.

11. The system of claim 10, wherein after the profile of the split clone is deleted by the processor executable back-up application, the back-up application notifies the storage operating system for re-using data blocks associated with the split clone.

12. The system of claim 10, wherein the back-up application displays a status of the clone split operation while the clone is being split from the replicated copy by the storage operating system.

13. The system of claim 12, wherein the back-up application interfaces with the storage system via a storage system interface for obtaining status information.

14. The system of claim 10, wherein the back-up application maintains a data structure for storing attributes of the profile of the split clone including the indicator for the profile type.

15. The system of claim 14, wherein the data structure is stored as part of a repository maintained by the back-up application for storing information regarding operations initiated by the back-up application.

16. A machine implemented method, comprising:
a processor for a server system executing a back-up application interfacing with a storage system executing a storage operating system;
using the back-up application to generate a clone of a replicated copy of a database;
sending, from the back-up application to the storage operating system, a request to split the clone from the replicated copy;
wherein the split clone operation is configured by the back-up application to save a selectable profile type for a split clone generated after the clone is split, where the profile type includes a first profile type that allows a profile of the split clone to be deleted via the back-up application and a second profile type that does not allow the profile to be deleted via the back-up application;
in response to the request, the storage operating system assigning a new data block to the clone to replace a data block shared between the clone and the replicated copy;
the back-up application generating a new profile for the split clone with the assigned new data block that is not shared between the clone and the replicated copy; wherein the new profile of the split clone is independent of any profile of the replicated copy and includes an indicator indicating the profile type and when the new profile is of the first profile type, the new profile can be automatically deleted via a user interface provided by the back-up application such that any data blocks associated with the split clone can be reused by the storage operating system for storing information for other objects; and
using the split clone with the new profile as an independent database for storing information.

17. The method of claim 16, wherein back-up application obtains status of the clone split operation and displays the status at the user interface.

18. The method of claim 16, further comprising:
providing an option to delete the new profile; and
deleting the new profile by the back-up application such that the data blocks associated with the new profile are released to the storage operating system.

19. The method of claim 18, wherein the back-up application notifies the storage operating system after the new profile is deleted for re-using the data blocks.

20. A non-transitory, machine readable storage medium storing executable instructions, which when executed by a machine, causes the machine to perform a method, the method comprising;
generating a replicated copy of a storage volume;
wherein the storage volume is managed by a storage operating system of a storage system;
wherein the storage operating system interfaces with a back-up application executed by a processor of a server; and
wherein the storage volume is replicated using a graphical user interface (GUI) provided by the back-up application;
creating a clone of the replicated copy using the back-up application; displaying, via the GUI, properties of the clone including storage space used exclusively by the clone and storage space shared between the clone and the replicated copy;

configuring a clone split operation using the back-up application for splitting the clone from the replicated copy by selecting, from a plurality of profile types, one profile type for a split clone that will be generated by the clone split operation;

wherein the plurality of profile types includes a first profile type that allows a profile of the split clone to be deleted via the back-up application and a second profile type that does not allow the profile to be deleted via the back-up application;

sending, from the back-up application to the storage operating system, a request to split the clone from the replicated copy;

in response to the request, the storage operating system executing the split operation and assigning a new data block to the clone to replace a data block shared between the replicated copy and the clone;

obtaining, by the back-up application a status on progress of the split operation from the storage operating system;

displaying the status via the GUI;

upon completion of the split operation, the back-up application generating a profile of the split clone with the assigned new data block that is not shared with the replicated copy;

wherein the profile of the split clone is independent of any profile of the replicated copy and the profile of the split clone includes an indicator indicating whether the profile is of the first profile type or the second profile type; and when the profile type for the profile is the first profile type, providing an option to a user to automatically delete the profile of the split clone via the GUI;

receiving a selection of the option via the GUI; and sending an instruction from the back-up application to the storage operating system to release any data blocks associated with the profile of the split clone such that the data blocks can be re-used by the storage operating system.

21. The storage medium of claim 20, wherein the profile of the split clone is deleted using the GUI and the back-up application notifies the storage operating system that the profile has been deleted.

* * * * *